US012809872B2

(12) United States Patent
Billa et al.

(10) Patent No.: US 12,809,872 B2
(45) Date of Patent: Nov. 24, 2026

(54) PROGRAMMABLE DATAFLOW UNIT

(71) Applicant: DataPelago, Inc., Mountain View, CA (US)

(72) Inventors: Satyanarayana Lakshmipathi Billa, Sunnyvale, CA (US); Rajan Goyal, Saratoga, CA (US); Abhishek Kumar Dikshit, San Jose, CA (US); Poon-Kuen Leung, Fremont, CA (US); Srinivas Perla, Saratoga, CA (US); Aqeel Mahesri, San Jose, CA (US); Kenneth A. Bullis, Mountain View, CA (US)

(73) Assignee: DataPelago, Inc., Mountain View, CA (US)

( * ) Notice: Subject to any disclaimer, the term of this patent is extended or adjusted under 35 U.S.C. 154(b) by 323 days.

(21) Appl. No.: 18/542,488

(22) Filed: Dec. 15, 2023

(65) Prior Publication Data

US 2025/0200049 A1 Jun. 19, 2025

(51) Int. Cl.
*G06F 9/48* (2006.01)
*G06F 16/2455* (2019.01)

(52) U.S. Cl.
CPC ...... *G06F 16/24568* (2019.01); *G06F 9/4881* (2013.01)

(58) Field of Classification Search
CPC ............. G06F 16/24568; G06F 9/4881; G06F 16/24569; G06F 16/90335
See application file for complete search history.

(56) References Cited

U.S. PATENT DOCUMENTS 8,312,037 B1 11/2012 Bacthavachalu et al.
8,332,388 B2 12/2012 Chaudhuri et al.
(Continued)

FOREIGN PATENT DOCUMENTS

EP 4564268 A1 6/2025
WO 2019/191578 A1 10/2019
(Continued)

OTHER PUBLICATIONS

Gopalakrishnan et al., "Speculative Dynamic Reconfiguration and Table Prefetching Using Query Look-Ahead in the ReProVide Near-Data-Processing System", Datenbank Spektrum, vol. 21, No. 1, Jan. 4, 2021, pp. 55-64.
(Continued)

*Primary Examiner* — Craig C Dorais
(74) *Attorney, Agent, or Firm* — Hamilton, Brook, Smith & Reynolds, P.C.

(57) ABSTRACT

A programmable dataflow unit processes a data analytics query. A manager parses a data flow graph (DFG) corresponding to the data analytics query and issues a plurality of commands each corresponding to a respective one of the sequence of tasks. A plurality of accelerator units process a subset of the commands corresponding to a given task of the plurality of distinct task types. Each accelerator unit includes 1) a plurality of executors that perform the given task on an input data stream and generate an output data stream, 2) a controller assigns the subset of the commands to the plurality of executors, and 3) a plurality of data interfaces each associated with a respective one of the plurality of executors that generate the input data stream and write the output data stream to a memory.

16 Claims, 16 Drawing Sheets

(56) References Cited

U.S. PATENT DOCUMENTS

| | | | |
|---|---|---|---|
| 9,602,529 B2 | 3/2017 | Jones et al. | |
| 10,042,966 B2 | 8/2018 | Chaudhuri et al. | |
| 10,264,029 B2 | 4/2019 | Lajoie et al. | |
| 10,452,449 B1 * | 10/2019 | Verplaetse | G06F 9/5044 |
| 10,860,553 B2 | 12/2020 | Faerber et al. | |
| 10,929,175 B2 | 2/2021 | Goyal et al. | |
| 11,082,350 B2 | 8/2021 | Dalal | |
| 11,709,833 B2 | 7/2023 | Shiran et al. | |
| 2008/0189252 A1 | 8/2008 | Branscome et al. | |
| 2012/0054236 A1 | 3/2012 | Branscome et al. | |
| 2012/0166417 A1 | 6/2012 | Chandramouli et al. | |
| 2019/0228037 A1 | 7/2019 | Nicol et al. | |
| 2019/0392002 A1 | 12/2019 | Lavasani et al. | |
| 2020/0301898 A1 | 9/2020 | Samynathan et al. | |
| 2021/0019362 A1 * | 1/2021 | Piveteau | G06N 3/084 |
| 2021/0073226 A1 | 3/2021 | Chavan et al. | |
| 2021/0097082 A1 | 4/2021 | Billa | |
| 2021/0097108 A1 | 4/2021 | Goyal et al. | |
| 2021/0326175 A1 * | 10/2021 | Herbert | G06F 9/541 |
| 2023/0092152 A1 | 3/2023 | Shwartz et al. | |
| 2023/0133020 A1 | 5/2023 | Sakalley et al. | |
| 2023/0162032 A1 | 5/2023 | Guha et al. | |
| 2023/0185622 A1 | 6/2023 | Saxena et al. | |
| 2023/0252006 A1 | 8/2023 | Barlew et al. | |
| 2024/0095249 A1 | 3/2024 | Aghababaie Beni et al. | |
| 2025/0013646 A1 | 1/2025 | Clarkson | |
| 2025/0199838 A1 | 6/2025 | Billa et al. | |
| 2025/0200039 A1 | 6/2025 | Billa et al. | |

FOREIGN PATENT DOCUMENTS

| | | |
|---|---|---|
| WO | 2025/117060 A1 | 6/2025 |
| WO | 2025/128844 A1 | 6/2025 |
| WO | 2025/128852 A1 | 6/2025 |
| WO | 2026/060437 A1 | 3/2026 |
| WO | 2026/060442 A1 | 3/2026 |

OTHER PUBLICATIONS

Lu et al., "SQL2FPGA: Automatic Acceleration of SQL Query Processing on Modern CPU-FPGA Platforms", 2023 IEEE 31st Annual International Symposium on Field-Programmable Custom Computing Machines (FCCM), May 8, 2023, pp. 184-194.

Wu et al., "Kernel Weaver: Automatically Fusing Database Primitives for Efficient GPU Computation", Microarchitecture (Micro) 2012 45TH Annual IEEE/ACM International Symposium On, IEEE, Dec. 1, 2012, pp. 107-118.

Codd, E.F., "A Relational Model of Data for Large Shared Data Banks", IBM Research Laboratory, Communications of the ACM, pp. 377-387, vol. 13, No. 6, Jun. 1970.

Codd, E.F., "Relational Completeness of Data Base Sublanguages", IBM Research Laboratory, RJ 987 (#17041), Mar. 6, 1972, Computer Sciences, 38 pages.

SQL Tutorial=> JOIN Terminology: Inner, Outer, Semi, Anti downloaded from https://riptutorial.com/sql/example/22934/ Aug. 7, 2023, 8 pages.

U.S. Appl. No. 18/541,993, entitled "System and Method for Computation Workload Processing," filed Dec. 15, 2023 (unpublished U.S. Patent Application is not being provided because the examiner has access to such document through Patent Center).

U.S. Appl. No. 18/542,291, entitled "System and Method for Input Data Query Processing," filed Dec. 15, 2023 (unpublished U.S. Patent Application is not being provided because the examiner has access to such document through Patent Center).

Gates et al., "Building a High-Level Dataflow System on Top of Map-Reduce: The Pig Experience," VLDB '09, Vo. 2, No. 2, Aug. 24-28, 2009, 12 pages.

Su et al., "Banyan: A Scoped Dataflow Engine for Graph Query Service," arXiv:2202. 12530, Feb. 25, 2022, pp. 1-14.

International Search Report and Written Opinion received for PCT Patent Application No. PCT/US2024/053197, mailed on Jan. 22, 2025, 15 pages.

Zhang et al., "SARA: Scaling a Reconfigurable Dataflow Accelerator", 2021 ACM/IEEE 48th Annual International Symposium on Computer Architecture (ISCA), 2021, 14 pages.

Hascoët, et al., "Hierarchical Dataflow Model for Efficient Programming of Clustered Manycore Processors", 28th Annual IEEE International Conference on Application-specific Systems, Architectures and Processors (ASAP 2017), Jul. 18, 2017, 7 pages.

Istvan, et al., "Caribou: Intelligent distributed storage", Proceedings of the VLDB Endowment, vol. 10, No. 11, 2017, pp. 1202-1213.

Jia, et al., "Dissecting the Graphcore IPU Architecture via Microbenchmarking", arXiv preprint arXiv: 1912.03413, Dec. 7, 2019, 91 pages.

Jun, et al., "BlueDBM: An Appliance for Big Data Analytics", ACM SIGARCH Computer Architecture News, vol. 43, No. 3S, Jun. 13-17, 2015, pp. 1-13.

Jun, et al., "BlueDBM: Distributed Flash Storage for Big Data Analytics", ACM Transactions on Computer Systems (TOCS), vol. 34, No. 3, Article 7, Jun. 2016, pp. 1-31.

Kaufmann, et al., "FlexNIC: Rethinking Network DMA", 15th Workshop on Hot Topics in Operating Systems (HotOS XV), May 2015, 7 pages.

Kaufmann, et al., "High Performance Packet Processing with FlexNIC", Proceedings of the Twenty-First International Conference on Architectural Support for Programming Languages and Operating Systems, Apr. 2-6, 2016, 15 pages.

Labrecque, et al., "Efficient Event Processing through Reconfigurable Hardware for Algorithmic Trading", Proceedings of the VLDB Endowment, vol. 3, No. 2, Sep. 13-17, 2010, pp. 1525-1528.

Lacey, "Preliminary IPU benchmarks - Providing previously unseen performance for a range of machine learning applications", Retrieved from URL: https://web.archive.org/web/20171026040110/https://www.graphcore.ai/posts/preliminary-ipu-benchmarks-providing-previously-unseen-performance-for-a-range-of-machine-learning-applications, Oct. 2017, 6 pages.

Lam, et al., "TSHMEM: Shared-Memory Parallel Computing on Tilera Many-Core Processors", IEEE International Symposium on Parallel & Distributed Processing, Workshops and Phd Forum, May 20-24, 2013, 10 pages.

Li, et al., "ClickNP: Highly Flexible and High Performance Network Processing with Reconfigurable Hardware", Proceedings of the 2016 Acm Sigcomm Conference, Aug. 22-26, 2016, pp. 1-14.

Liatifis, et al., "Advancing SDN from OpenFlow to P4: A Survey", ACM Computing Surveys, vol. 55, No. 9, Article 186, Jan. 2023, pp. 1-37.

Liu, et al., "E3: Energy-Efficient microservices on SmartNIC-Accelerated servers", USENIX Annual Technical Conference, Jul. 10-12, 2019, 17 pages.

Liu, et al., "Offloading Distributed Applications onto SmartNICs using iPipe", Proceedings of the ACM Special Interest Group on Data Communication, Aug. 19-23, 2019, pp. 318-333.

Lottarini, et al., "Master of None Acceleration: A Comparison of Accelerator Architectures for Analytical Query Processing", Proceedings of the 46th International Symposium on Computer Architecture, Jun. 22-26, 2019, pp. 762-773.

Miomandre, et al., "Embedded runtime for reconfigurable dataflow graphs on manycore architectures", Proceedings of the 9th Workshop and 7th Workshop on Parallel Programming and RunTime Management Techniques for Manycore Architectures and Design Tools and Architectures for Multicore Embedded Computing Platforms, Jan. 23, 2018, 6 pages.

Morris, "The Click Modular Router", Acm Sigops Operating Systems Review, vol. 33, Issue 5, Dec 12, 1999, pp. 217-231.

Mueller, et al., "FPGAs: A New Point in the Database Design Space", Proceedings of the 13th International Conference on Extending Database Technology, Mar. 22-26, 2010, pp. 721-723.

Mueller, et al., "Glacier: A Query-to-Hardware Compiler", Proceedings of the 2010 Acm Sigmod International Conference on Management of data, Jun. 6-11, 2010, pp. 1159-1162.

Mueller, et al., "Streams on Wires - A Query Compiler for FPGAs", Proceedings of the VLDB Endowment, vol. 2, No. 1, Aug. 24-28, 2009, 12 pages.

(56) References Cited

OTHER PUBLICATIONS

Murray, et al., "Incremental, iterative data processing with timely dataflow", Communications of the ACM, vol. 59, No. 10, Oct. 2016, pp. 75-83.
Murray, et al., "Naiad: a timely dataflow system", Proceedings of the Twenty-Fourth ACM Symposium on Operating Systems Principles, Nov. 3-6, 2013, 17 pages.
Mustard, et al., "Compilation-assisted performance acceleration for data analytics", Diss. University of British Columbia, Sep. 2020, 155 pages.
Nai, et al., "GraphPIM: Enabling Instruction-Level PIM Offloading in Graph Computing Frameworks", IEEE International symposium on high performance computer architecture (HPCA), Feb. 4-8, 2017, 12 pages.
Najafi, et al., "Hardware Acceleration Landscape for Distributed Real-time Analytics: Virtues and Limitations", 2017 IEEE 37th International Conference on Distributed Computing Systems (ICDCS), Jun. 5-8, 2017, 11 pages.
Nechi, et al., "FPGA-based Deep Learning Inference Accelerators: Where Are We Standing?", ACM Transactions on Reconfigurable Technology and Systems, vol. 16, No. 4, Article 60, Oct. 2023, pp. 1-32.
Nicol, "A coarse grain reconfigurable array (CGRA) for statically scheduled data flow computing", Wave Computing, Oct. 2017, pp. 1-9.
Nicol, "A Dataflow Processing Chip for Training Deep Neural Networks", Wave Computing, Jul. 2017, 25 pages.
Oguntebi, et al., "GraphOps: A Dataflow Library for Graph Analytics Acceleration", ACM/SIGDA International Symposium on Field-Programmable Gate Arrays, Feb. 21-23, 2016, pp. 111-117.
Oguntebi, et al., "GraphOps: A Dataflow Library for Graph Analytics Acceleration-Slide", Kunle Olukotun Pervasive Parallelism Laboratory, FPGA 2016, Feb. 22, 2016, 48 pages.
Owaida, et al., "Centaur: A framework for hybrid CPU-FPGA databases", International Symposium on Field-Programmable Custom Computing Machines (FCCM), Apr. 30-May 2, 2017, pp. 211-218.
Patterson, et al., "Teaching Machines To Understand Data Science Code By Semantic Enrichment of Dataflow Graphs", arXiv: 1807.05691v2, Jan. 25, 2019, 33 pages.
Peer, "Mapping P4 to SmartNICs", Netronome Systems, Inc., May 16, 2017, 19 pages.
Phothilimthana, "Programming Abstractions and Synthesis-Aided Compilation for Emerging Computing Platforms", Diss. University of California, Sep. 2018, 166 pages.
Phothilimthana, et al., "Floem: A Programming System for NIC-Accelerated Network Applications", 13th USENIX Symposium on Operating Systems Design and Implementation, Oct. 8-10, 2018, 18 pages.
Polig, et al., "Compiling Text Analytics Queries to FPGAs", 2014 24th International Conference on Field Programmable Logic and Applications (FPL), Sep. 2-4, 2014, 6 pages.
Putnam, et al., "A Reconfigurable Fabric for Accelerating Large-Scale Datacenter Services", Acm Sigarch Computer Architecture News, vol. 42, No. 3, Jun. 2014, pp. 13-24.
Salapura et al., "Accelerating Business Analytics Applications", IEEE International Symposium on High-Performance Comp Architecture, Feb. 2012, 10 pages.
Shao, et al., "Improving performance of graph processing on FPGA-DRAM platform by two-level vertex caching", ACM/SIGDA International Symposium on Field-Programmable Gate Arrays, Feb. 24-26, 2019, pp. 320-329.
Shuai, "Virtual DPU Development Based on IEC61131-3", Dissertation, North China Electric Power University, Mar. 2014, 54 pages.
Sidhu et al., "Fast Regular Expression Matching using FPGAs", Proceedings of the 9th Annual IEEE Symposium on Field-Programmable Custom Computing Machines (FCCM'01), Mar. 29-Apr. 2, 2001, 12 pages.
Sidler, et al., "Accelerating pattern matching queries in hybrid CPU-FPGA architectures", International Conference on Management of Data, May 14-19, 2017, pp. 403-415.
Silberstein, "The new life of SmartNICs", ACM SIGARCH, Apr. 16, 2018, 11 pages.
Sommese, "Boosting the performance of NFV services with SmartNIC", Master Degree Thesis, Politecnico Di Torino, Oct. 2018, 85 pages.
Stark, et al., "NFP-6xxx—A 22nm High-Performance Network Flow Processor for 200Gb/s Software Defined Networking", Netronome, Aug. 2013, 21 pages.
Tao, et al., "Parallel work system for image processing based on stream processor and its algorithm of stream- oriented", Chinese Journal of Electron Devices, vol. 33, No. 6, Dec 2010, 6 pages.
Teubner, et al., "Data Processing on FPGAs", Synthesis Lectures On Data Management, Jun. 2013, 120 pages.
Teubner, et al., "How Soccer Players Would do Stream Joins", SIGMOD '11, Jun. 12-16, 2011, pp. 625-636.
Thies, et al., "StreaMIT: A Language for Streaming Applications", International Conference on Compiler Construction, Aug. 6, 2001, 17 pages.
Wang, et al., "Hyperscan: A Fast Multi-pattern Regex Matcher for Modern CPUs", Usenix, Feb. 26-28, 2019, 19 pages.
"Accelerating Next Generation Artificial Intelligence", Graphcore, Retrieved from URL: https://web.archive.org/web/20181116040255/https://www.graphcore.ai/technology, Nov. 2018, 3 pages.
"ANSI/ISO/IEC International Standard (IS) Database Language SQL—Part 2: Foundation (SQL/Foundation)", ISO/IEC, Sep. 1999, 1147 pages.
"Coolidge™ MPPA®DPU", Kalray, Jun. 2022, 16 pages.
"Cuda C Programming Guide", NVIDIA, Oct. 2018, 311 pages.
"Graph Toolchain for IPU", Poplar, Dec 2018, 19 pages.
"Kalray Cto Receives Award for Hipeac Paper About Kalray Mppa® Technology", Kalray, Sep. 26, 2019, 2 pages.
"Marvell Octeon-III, CN70XX and CN71XX Single to QuadCore Embedded Processors with Hardware Virtualization", Marvell, Nov. 2020, 11 pages.
"Microsoft Unveils Project Brainwave for real-time AI", Microsoft Research Blog, Aug. 22, 2017, 6 pages.
"Netronome Flow Processor (NFP) Kernel Drivers", Netronome Systems, Retrieved from URL: https://web.archive.org/web/20210612212222/https://www.kernel.org/doc/html/latest/networking/device_drivers/ethernet/netronome/nfp.html, Jun. 2021, 4 pages.
"Netronome NFP-6000 Flow Processor", Netronome, Jul. 2020, 3 pages.
"Netronome Unveils 200 Gbps FlowProcessor", Design & Reuse, Jun. 2012, 3 pages.
"NVIDIA® Mellanox® BlueField® SmartNIC for Ethernet", Mellanox Technologies, May 2020, 3 pages.
"OPAE C API Programming Guide", 2017, 11 pages.
"Our Ipu Lets Innovators Create the Next Generation of Artificial Intelligence", Graphcore, Retrieved from URL: https://web.archive.org/web/20190104082329/https://www.graphcore.ai/, Jan. 2019, 3 pages.
"P416 Language Specification", The P4 Language Consortium, May 22, 2017, 129 pages.
"Project Brainwave", Microsoft Research, May 6, 2019, 3 pages.
"SDAccel Development Environment", Xilinx, Retrieved from URL: https://web.archive.org/web/20150711215646/http://www.xilinx.com:80/products/design-tools/software-zone/sdaccel.html, Jul. 2015, 7 pages.
"Stingray™ PS225 SmartNIC Adapters Dual-Port 25 GB/s PCI Express Ethernet SmartNIC Adapters", Broadcom, Jun. 27, 2018, 15 pages.
"The Netezza data appliance architecture: A platform for high performance data warehousing and analytics", Netezza Corporation, Aug. 2009, 10 pages.
"Wave Computing: Designed To Scale", Moor Insights & Strategy, Sep. 2018, 9 pages.
"13. NFP poll mode driver library", Network interface controller drivers, vol. 16.04, Apr. 2016, 5 pages.
"20. NFP poll mode driver library", Network interface controller drivers, vol. 17.05, May 2017, 2 pages.

(56) References Cited

OTHER PUBLICATIONS

"24. NFP poll mode driver library", Network interface controller drivers, vol. 18.02, Feb. 2018, 3 pages.
"26. NFP poll mode driver library", Network interface controller drivers, vol. 18.08.0, Aug. 2018, 4 pages.
"OPAE Intel FPGA Linux Device Driver Architecture Guide", Intel, vol. 683857, Oct. 2, 2017, 20 pages.
Abadi, et al., "Tensorflow: Large-scale machine learning on heterogeneous distributed systems", arXiv preprint arXiv:1603.04467, Mar. 16, 2016, 19 pages.
Agilio Open vSwitch TC User Guide, Netronome, Aug. 15, 2019, 29 pages.
Agilio SmartNIC Basic Firmware User Guide, Netronome, Feb. 8, 2019, 27 pages.
Akidau, et al., "The dataflow model: a practical approach to balancing correctness, latency, and cost in massive-scale, unbounded, out-of-order data processing", Proceedings of the VLDB Endowment, vol. 8, No. 12, Aug. 2015, pp. 1792-1803.
Beard, et al., "Raftlib: A C++ template library for high performance stream parallel processing", PMAM '15: Proceedings of the Sixth International Workshop on Programming Models and Applications for Multicores and Manycores, Feb. 7-8, 2015, pp. 96-105.
Bezati, et al., "Streamblocks: A compiler for heterogeneous dataflow computing (Technical Report)", arXiv preprint arXiv:2107.09333, Jul. 20, 2021, 15 pages.
Bu., et al., "Pergelix: Big(ger) Graph Analytics on A Dataflow Engine", arXiv:1407.0455v1, Jul. 2, 2014, 12 pages.
Butts, et al., "A Structural Object Programming Model, Architecture, Chip and Tools for Reconfigurable Computing", IEEE Symposium on Field-Programmable Custom Computing Machines, Apr. 23, 2007, 10 pages.
Capalija, "A high-performance overlay architecture for pipelined execution of data flow graphs", International Conference on Field programmable Logic and Applications, Sep. 2013, 8 pages.
Caulfield, et al., "A Cloud-Scale Acceleration Architecture", IEEE/ACM International Symposium on Microarchitecture (MICRO), Oct. 2016, 13 pages.
Chaudhuri, et al., "SAT-Based Compilation to a non-vonNeumann Processor", IEEE/ACM International Conference on Computer-Aided Design (ICCAD), Nov. 13-17, 2017, 8 Pages.
Choi, et al., " ?- NIC: Interactive Serverless Compute on Programmable SmartNICs", International Conference on Distributed Computing Systems (ICDCS), arXiv: 1909.11958v1 [cs.NI]; Sep. 26, 2019, 15 pages.
Chung, et al., "LINQits: Big data on Little Clients", Acm Sigarch Computer Architecture News, vol. 41, No. 3, Jun. 23, 2013, pp. 261-272.
Clarke, "Intel makes flow processor with ARM inside, for Netronome", EE times, Jun. 6, 2012, 4 pages.
Cong, et al., "Customizable computing-from single chip to datacenters", Proceedings of the IEEE, vol. 107, No. 1, Oct. 10, 2018, pp. 185-203 (19 pages).
Dennl, et al., "Acceleration of SQL Restrictions and Aggregations through FPGA-based Dynamic Partial Reconfiguration", 2013 IEEE 21st Annual International Symposium on Field-Programmable Custom Computing Machines, Apr. 28-30, 2013, 4 pages.
Dimolianis et al., "White Paper: High-Performance Flow Monitoring Using Programmable Network Interface Cards", GÉANT, Jan. 30, 2023, 28 pages.
Dogan, et al. "Accelerating Synchronization Using Moving Compute to Data Model at 1,000-core Multicore Scale." ACM Trans. Archit. Code Optim. 16, 1, Article 4, Feb. 2019, 27 pages.
Eran, et al., "NICA: An infrastructure for inline acceleration of network applications", USENIX Annual Technical Conference, Jul. 10-12, 2019, pp. 345-361.
Essertel, et al. "Flare: Optimizing Apache Spark with Native Compilation for Scale-Up Architectures and Medium-Size Data", USENIX Symposium on Operating Systems Design and Implementation, Oct. 8-10, 2018, pp. 799-815 (18 pages).
Fiessler, et al., "HyPaFilter+: Enhanced Hybrid Packet Filtering Using Hardware Assisted Classification and Header Space Analysis", IEEE/ACM Transactions on Networking, vol. 25, No. 6, Dec 2017, pp. 3655-3669.
Fowers, et al., "A Configurable Cloud-Scale DNN Processor for Real-Time AI", ACM/IEEE 45th Annual International Symposium on Computer Architecture (ISCA), Jun. 1-6, 2018, 14 pages.
Fyles, "Graph Computing for Machine Intelligence With Poplar", Graphcore, Feb. 23, 2017, 8 pages.
Gong, et al., "ShuntFlowPlus: An Efficient and Scalable Dataflow Accelerator Architecture for Stream Applications", ACM Journal on Emerging Technologies in Computing Systems (JETC), vol. 17, No. 4, Jun. 2021, pp. 1-24.
Gonzalez, "GraphX: Graph Processing in a Distributed Dataflow Framework", USENIX Symposium on Operating Systems Design and Implementation (OSDI '14), Oct. 6-8, 2014, 16 pages.
Wei, et al., "A Hp Heterogenous Multiprocessor Architectural Platform and Its Application", Computer Engineering & Science, vol. 33, No. 1, Jan. 2011, 6 pages.
Woods, et al., "Parallel computation of skyline queries", International Symposium on Field-Programmable Custom Computing Machines, Apr. 28-30, 2013, 8 pages.
Wu, et al., "Q100: The Architecture and Design of a Database Processing Unit", Columbia University, ASPLOS '14, Mar. 1-5, 2014, 14 pages.
Wu, et al., "Q100: The Architecture and Design of a Database Processing Unit", Columbia University, Mar. 6, 2014, 87 pages.
Wu, et al., "The Q100 Database Processing Unit", IEEE Computer Society, May 13, 2015, pp. 34-46.
Xu, "Design and Realization of Video Coding in High Definition IP Camera Based on Stream Processor", Thesis Submitted to Ningbo University for the Master's Degree, Jan. 12, 2010, 84 pages.
Zhang, et al., "Scalable Interconnects for Reconfigurable Spatial Architectures", Proceedings of the 46th International Symposium on Computer Architecture, Jun. 22-26, 2019, pp. 615-628.
Ziener, et al., "FPGA-based dynamically reconfigurable SQL query processing", ACM Transactions on Reconfigurable Technology and Systems, vol. 9, No. 4, Article 25, Aug. 2016, pp. 1-24.

* cited by examiner

PROGRAMMABLE DATAFLOW UNIT

RELATED APPLICATIONS

This application is related to U.S. application Ser. No. 18/541,993, entitled "System and Method for Computation Workload Processing", filed on Dec. 15, 2023, and U.S. application Ser. No. 18/542,291, entitled "System and Method for Input Data Query Processing", filed on Dec. 15, 2023. The entire teachings of the above applications are incorporated herein by reference.

BACKGROUND

A data lake is a repository designed to store and process large amounts of structured and/or unstructured data. Conventional data lakes provide limited real-time or batch processing of stored data and can analyze the data by executing commands issued by a user in structured query language (SQL) or another programming language. The exponential growth of computer data storage raises several challenges for storage, retrieval, and analysis of data. In particular, data lakes and other data storage systems have the capacity to store large and ever-increasing quantities of data, and provide rapid, thorough analysis of this data in response to user inquiries.

SUMMARY

Example embodiments include a circuit for processing a data analytics query. A manager (MCP) may be configured to parse a data flow graph (DFG) corresponding to the data analytics query, the DFG defining a sequence of tasks having a plurality of distinct task types, and issue a plurality of commands each corresponding to a respective one of the sequence of tasks. A plurality of accelerator units (AXL) may each be configured to process a subset of the commands corresponding to a given task of the plurality of distinct task types. Each accelerator unit may include 1) a plurality of executors (AXE) configured to perform the given task on an input data stream and generate an output data stream, 2) a controller (ACP) configured to assign the subset of the commands to the plurality of executors, and 3) a plurality of data interfaces (ADP) each associated with a respective one of the plurality of executors and configured to generate the input data stream and write the output data stream to a memory.

The manager may be further configured to 1) map the sequence of tasks to the plurality of accelerator units in accordance with the data flow graph, and 2) configure a plurality of logical connections between the plurality of accelerator units, the plurality of logical connections corresponding to links between the tasks of the data flow graph. A streaming cache buffer may be connected between the memory and the plurality of accelerator units, and may be configured to 1) allocate a cache line for a write by one of the data interfaces, 2) maintain a read count of the cache line, and 3) deallocate the cache line in response to the read count decrementing to a threshold value. The streaming cache buffer may be configured to store structured data via a value stream and an auxiliary stream.

The manager may include a plurality of submission queues, and may be configured to 1) read the sequence of tasks as respective entries from the plurality of submission queues, and 2) issue the plurality of commands in an order corresponding to an output of the plurality of submission queues. The manager may include an arbiter configured to determine the output of the plurality of submission queues based on a weighted round-robin priority.

Each of the manager and plurality of accelerator units may be configured to control a respective data path to the memory. A crossbar unit (XDP) may be configured to arbitrate memory access requests by the plurality of accelerator units. The plurality of distinct task types may include at least one of scanning, parsing, moving, hashing, and vector processing.

The plurality of accelerator units may include a scanning accelerator unit configured to perform at least one of 1) splitting the input stream into multiple tokens based on a table defining a plurality of data classes each associated with a respective token, 2) dividing the input stream into a plurality of strings and identifying a pattern common to the plurality of strings, and 3) identifying multiple overlapping patterns occurring within the input stream.

The plurality of accelerator units may include a parsing accelerator unit configured to 1) parse a stream of tokens based on a ruleset, the stream of tokens indicating data classes of the input stream, 2) generating multiple output streams each corresponding to a distinct data field type. The plurality of accelerator units may further include a mover accelerator unit configured to 1) generate a transformed output stream based on the input stream, and 2) direct the transformed output stream to a location distinct from that of the input stream.

The plurality of accelerator units may include a hasher accelerator unit configured to 1) update a hash table comprising a plurality of entries, each entry including a key and a set of values, 2) perform a search of the input stream to identify values base on the hash table, and 3) generate the output stream as a result of the search. The plurality of accelerator units may further include a vector processor accelerator unit configured to 1) perform an arithmetic operation on a plurality of input streams including the input stream, and 2) generate the output stream as a result of the arithmetic operation.

The controller may be further configured to control the output data stream to generate a continuous output. The plurality of data interfaces may be further configured to write the output data stream concurrently with the performance of the given task by the plurality of executors.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Conventional data analytics platforms are constrained in ways that prevent them from meeting the demands of modern data storage, retrieval and analysis. For example, many existing analytics systems employ general-purpose processors (e.g., x86 CPUs) that manage retrieval of data from a database for processing a query. However, such systems often have inadequate bandwidth for retrieving and analyzing large stores of structured and unstructured data such as those of modern data lakes. Further, the output data resulting from queries of such data stores may be much larger than the input data, placing a bottleneck on system performance. Typical query languages, such as SQL for non-limiting example, can produce inefficient or nonoptimal plans for such systems, leading to delays or missed data. Such plans can also lead to a mismatch between I/O and computing load. For example, in a CPU-based analytics system, I/O may be under-utilized due to an overload of computation work demanded of the CPU.

The Consistency, Availability, and Partition Tolerance (CAP) theorem states that a distributed data store is capable of providing only two of the following three guarantees:

a) Consistency: Every read operation receives data in accordance with the most recent write operation.

b) Availability: Every request receives a response.

c) Partition tolerance: The system will continue to operate despite experiencing delay or dropping of messages.

Similar to the CAP theorem, existing data stores cannot maximize dataset performance, size, and freshness simultaneously; prioritizing two of these qualities leads to the third being compromised. Thus, prior approaches to data analytics have been limited from deriving cost-efficient and timely insights from large datasets. Attempts to solve this problem have led to complex data pipelines having fragmented data silos.

Example embodiments, described below, provide data analytics platforms that overcome several of the aforementioned challenges in data analytics. In particular, a query compiler generates an optimized data flow graph from an input query, providing efficient workflow instructions for the platform. Programmable Dataflow Units (PDUs) are hardware engines for executing the query in accordance with the workflow and include a number of distinct accelerators that may each be optimized for different operations within the workflow. Such platforms may also match the impedance between computational load and I/O. As a result, data analytics platforms in example embodiments can provide consistent, cost-efficient, and timely insights from large datasets.

Figure 1A:
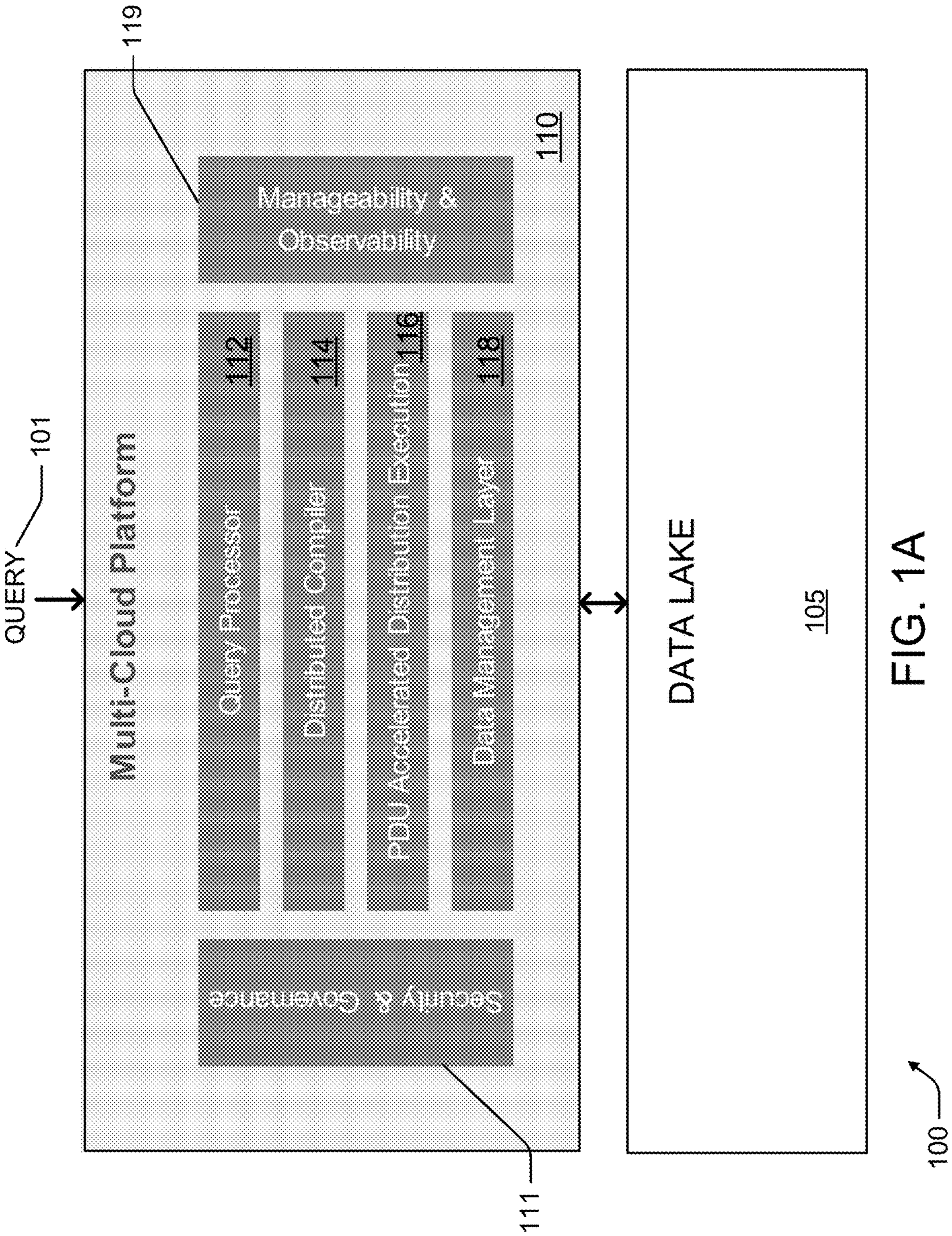
FIGS. 1A-B are block diagrams of a data analytics system in one embodiment.

FIG. 1A is a block diagram of a data analytics system 100 in one embodiment. The system 100 includes a data lake 105 for storing structured and/or unstructured data. Alternatively, a plurality of data lakes, or a combination of data lakes, data warehouses and/or other data stores, may be implemented in place of the data lake 105. A multi-cloud analytics platform 110 may be configured to receive a data query 101, analyze the data of the data lake 105 in accordance with the query 101, and provide a corresponding result to a user. The platform 110 may be implemented via a plurality of cloud networks that may each comprise at least one server, as described in further detail below. Functional elements of the platform 110 are shown in FIG. 1A, including a query processor 112, a distributed compiler 114, a PDU block 116, a data management layer 118, a security manager 111, and a management controller 119 for non-limiting examples.

The query processor 112 receives the query 101 from a user. The query 101 may be written in a data analytics language, such as SQL or Python for non-limiting examples, and represents the user's intent for analysis of the data stored at the data lake 105. The query processor 112 may receive and process the query 101 to generate a corresponding data flow graph, which defines an analytics operation as a tree of nodes, each node representing a distinct action. The distributed compiler 114 compiles the data flow graph into machine-readable instructions for execution by an insight virtual machine (VM) operated at the PDU block 116. The data management layer 118 interfaces with the data lake 105 to access data requested by the PDU block 116. The security manager 111 provides secured access to the platform 110, and may control the authentication, authorization and confidentiality components of the platform 110. Lastly, the management controller 119 may enable users to view and manage operations of the platform 110, and may manage the components of the platform 110, such as monitoring, relocation of components in response to a failure, scaling on up and down, and observing the usage and performance of components.

The analytics platform 110 can provide several advantages over conventional data analytics solutions. For example, the platform 110 can be scaled easily to service data lakes of any size while meeting demands for reliable data analytics, providing a fully managed analytics service on decentralized data. Further, because the platform 110 can process data regardless of its location and format, it can be adapted to any data store, such as the data lake 105, without changing or relocating the data.

Figure 1B:
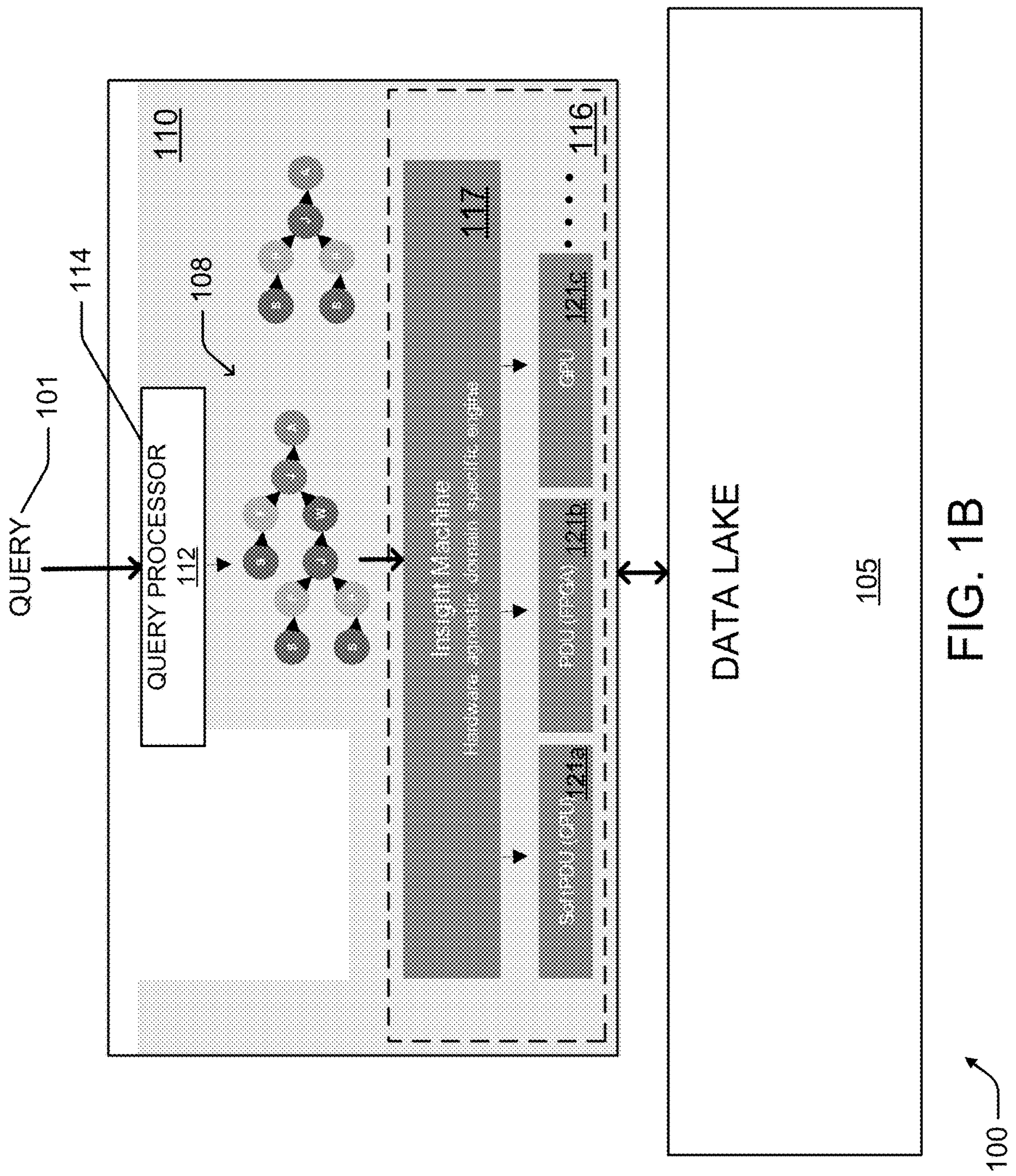

FIG. 1B illustrates the data analytics system 100 in further detail. Here, the query processor 112 may receive and process the query 101 to generate corresponding data flow graphs (DFGs) 108, which define analytics operations as a tree of nodes, each node representing a distinct action. An insight machine 117, operated at the PDU block 116, may be a domain-specific virtual machine with a respective instruction set architecture (ISA), and may receive the DFGs 108 (e.g., as machine-readable instructions representing the DFGs as generated by the distributed compiler 114). The insight machine 117 may then interpret the DFGs 108 to determine an assignment of computing elements 121*a-c*, including CPUs 121*a*, PDUs 121*b*, and GPUs 121*c*, for executing an analytics operation in accordance with the DFGs 108. In doing so, the insight machine 117 may generate a work plan for efficient execution by the computing elements 121*a-c*.

Figure 2:
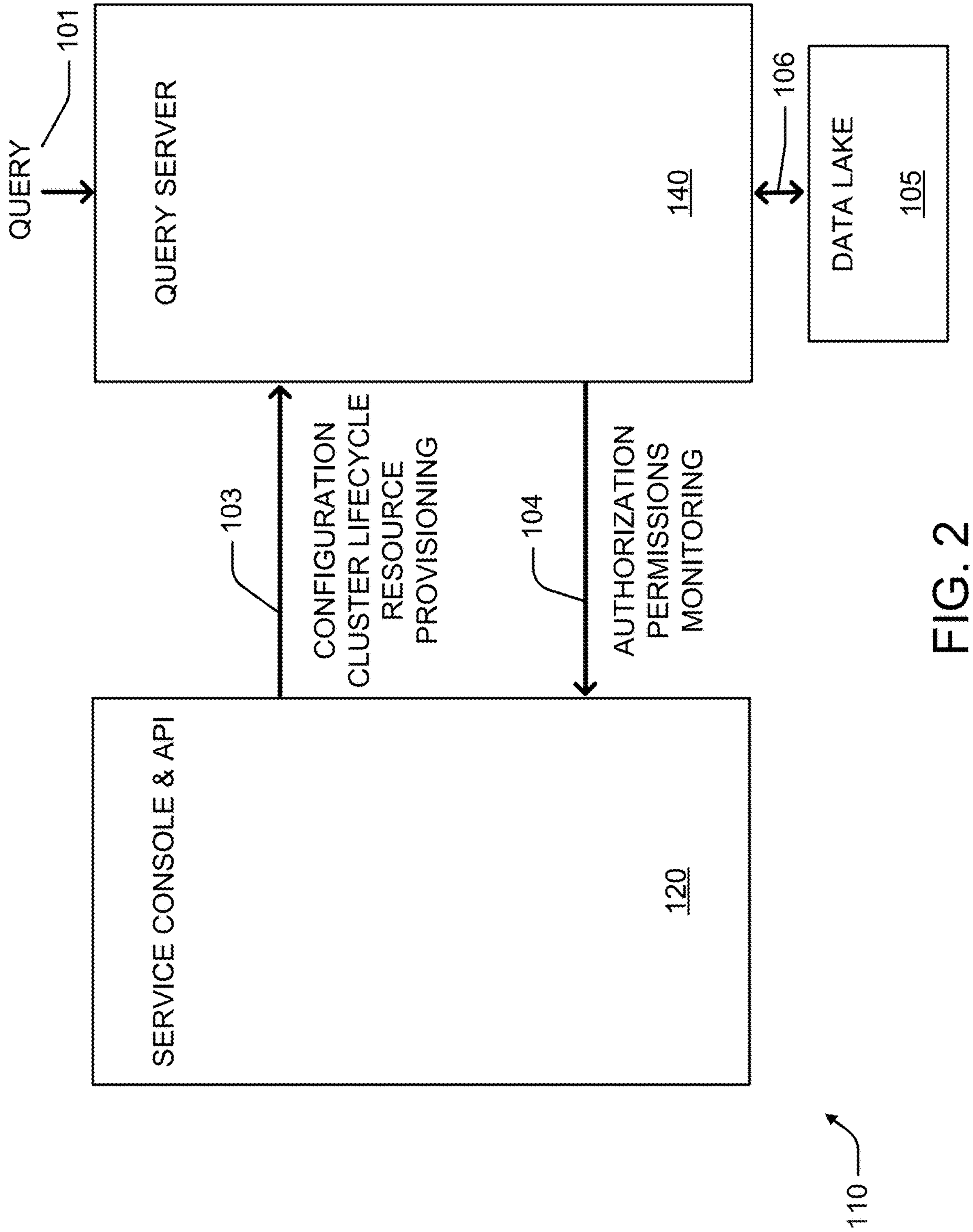
FIG. 2 is a block diagram of a multi-cloud analytics platform in one embodiment.

FIG. 2 is a block diagram of a multi-cloud analytics platform in one embodiment. In the example embodiment of FIG. 2, the analytics platform 110 is shown as two networked servers, a service console server 120, and a query server 140 for example. The servers 120, 140 may each be comprised of one or more physical servers configured as a cloud service. The service console server 120 may provide a user interface to a managing user through a connected device (not shown), enabling the managing user to monitor the performance and configuration of the query server 140. The query server 140 may communicate with a client user (e.g., an owner of the data lake 105) to receive the query 101, access the data lake 105 to perform an analytics operation in accordance with the query 101, and return a corresponding result to the user. The service console server 120 may transmit management and configuration commands 103 to manage the query server 140, while the query server 140 may provide monitoring communications 104 to the service console server 120. Each of the servers 120, 140 are described in further detail below with reference to FIGS. 3 and 4.

Figure 3:
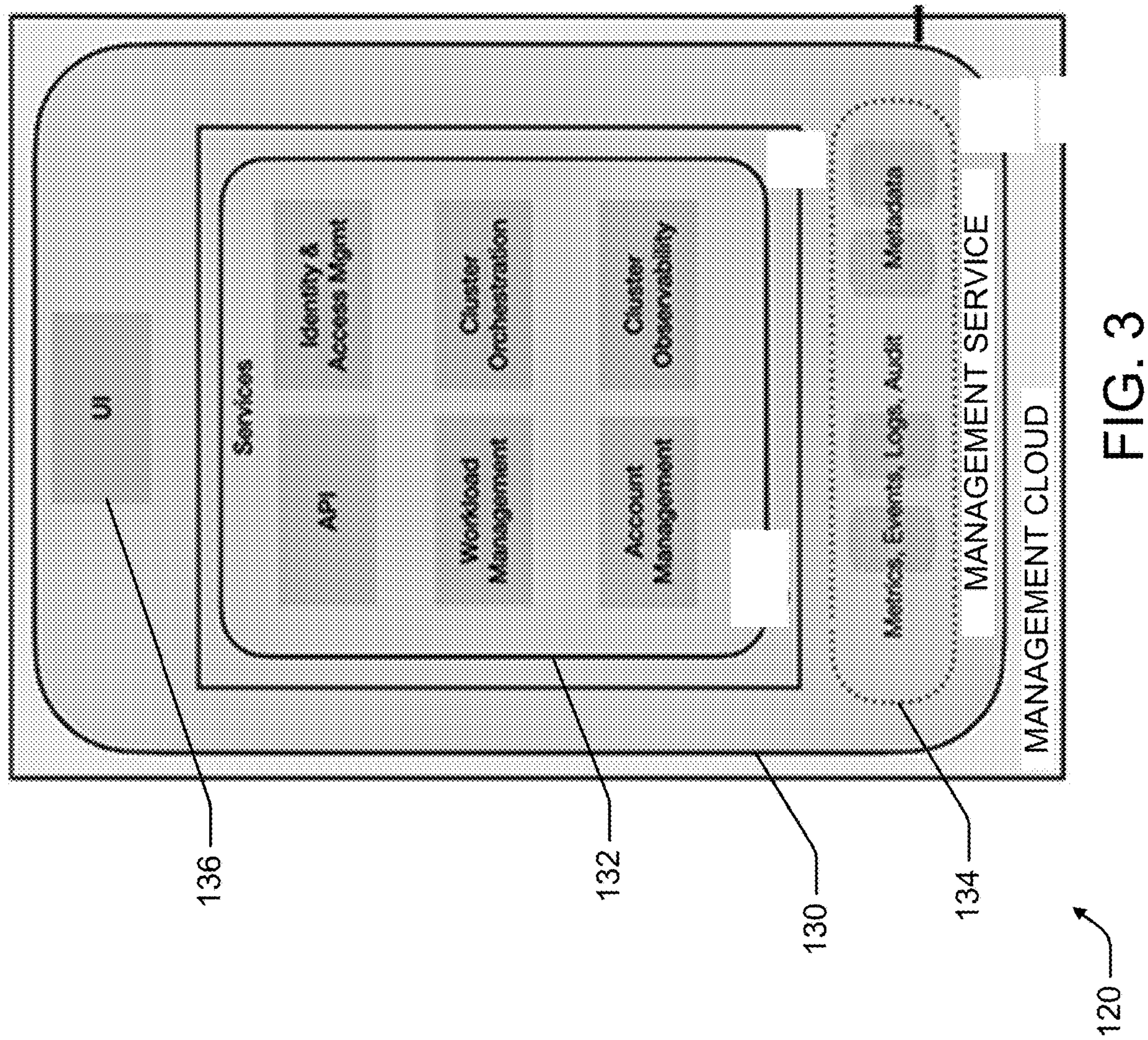
FIG. 3 is a block diagram of a service console server in further detail.

FIG. 3 illustrates the service console server 120 in further detail, with attention to functional blocks that may be operated by the server 120. A user interface 136 can be accessed by a managing user via a computing device (not shown) connected via the Internet or another network, and provides the managing user with access to a plurality of services 132:

a) Application Programming Interface (API): Provides the necessary functionality to drive the user interface (UI).
b) Identity and Access Management: Provides authentication services, including verifying the authenticity of the platform user and authorization, and controlling access to various components of the platform to various platform users.
c) Workload Management: Manages the control plane workloads, such as creating a cluster and destroying a cluster.
d) Cluster Orchestration: Controls operations to create, destroy, start, stop, and relocate the clusters.
e) Account Management: Manages the customer account and users within the customer account.
f) Cluster Observability: Monitors the cluster for usage and failures so that it can be relocated to other physical machines if the failures rate crosses a threshold.

The service console server 120 may also include a data store 134 configured to store a range of data associated with the platform 110, such as performance metrics, operational events (e.g., alerts), logs indicating queries and responses, and operational metadata.

Figure 4:
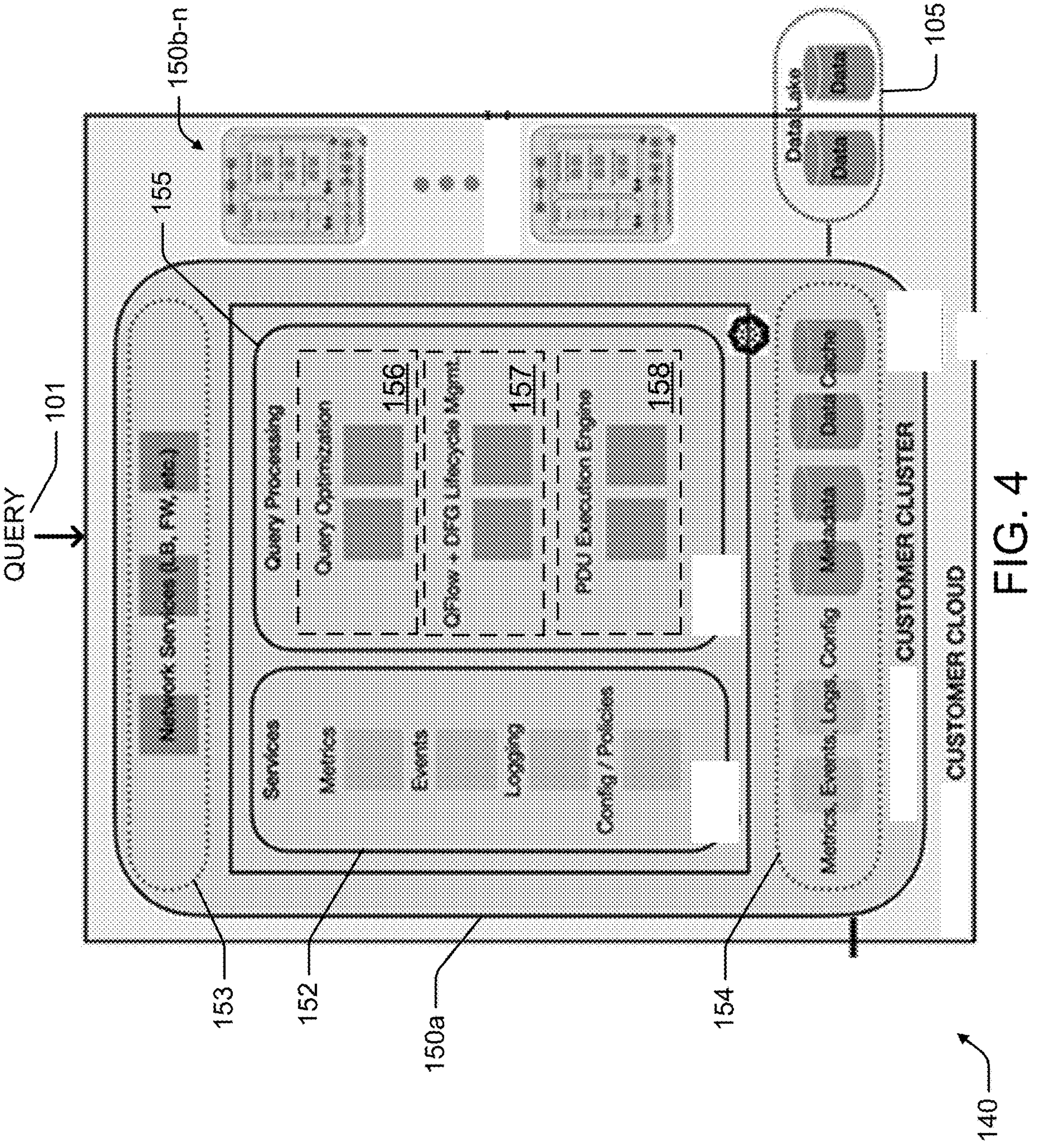
FIG. 4 is a block diagram of a query processing cloud in further detail.

FIG. 4 illustrates the query server 140 in further detail. As a cloud service, the server 140 may comprise a plurality of cluster servers 150*a-n*, of which server 150*a* is shown in detail. Each of the server clusters 150*a-n* may be communicatively coupled to the data lake 105 to allow independent access to the stored data. In response to the query 101, the server clusters 150*a-n* may coordinate to determine an efficient distribution of tasks to process the query, execute analytics tasks, and generate a corresponding response.

The cluster server 150*a* is depicted as a plurality of functional blocks that may be performed by a combination of hardware and software as described in further detail below. Network services 153 may be configured to interface with a user device (not shown) across a network to receive a query, return a response, and communicate with the service console server 120. Query services 155 include a query optimization block 156, a scheduler 157, and a PDU executor 158. As described below with reference to FIG. 5, the query services 155 operate to generate an optimized intermediate representation (IR) of a query, produce a data flow graph (DFG) defining execution of the optimized IR, and execute the query.

A management services block 152 may monitor operation of the server cluster 150*a*, recording performance metrics and events and maintaining a log of the same. The management services block 152 may also govern operation of the query services 155 based on a set of configurations and policies determined by the user. Further, the management services block 152 may communicate with the service console server 120 to convey performance metrics and events and to update policies as communicated by the server 120. Lastly, a data store 154 may be configured to store the data controlled by the management services block 152, including performance metrics, operational events, logs indicating queries and responses, and operational metadata. The data store 154 may also include a data cache configured to store a selection of data retrieved from the data lake 105 for use by the query services 155 for executing a query.

Figure 5:
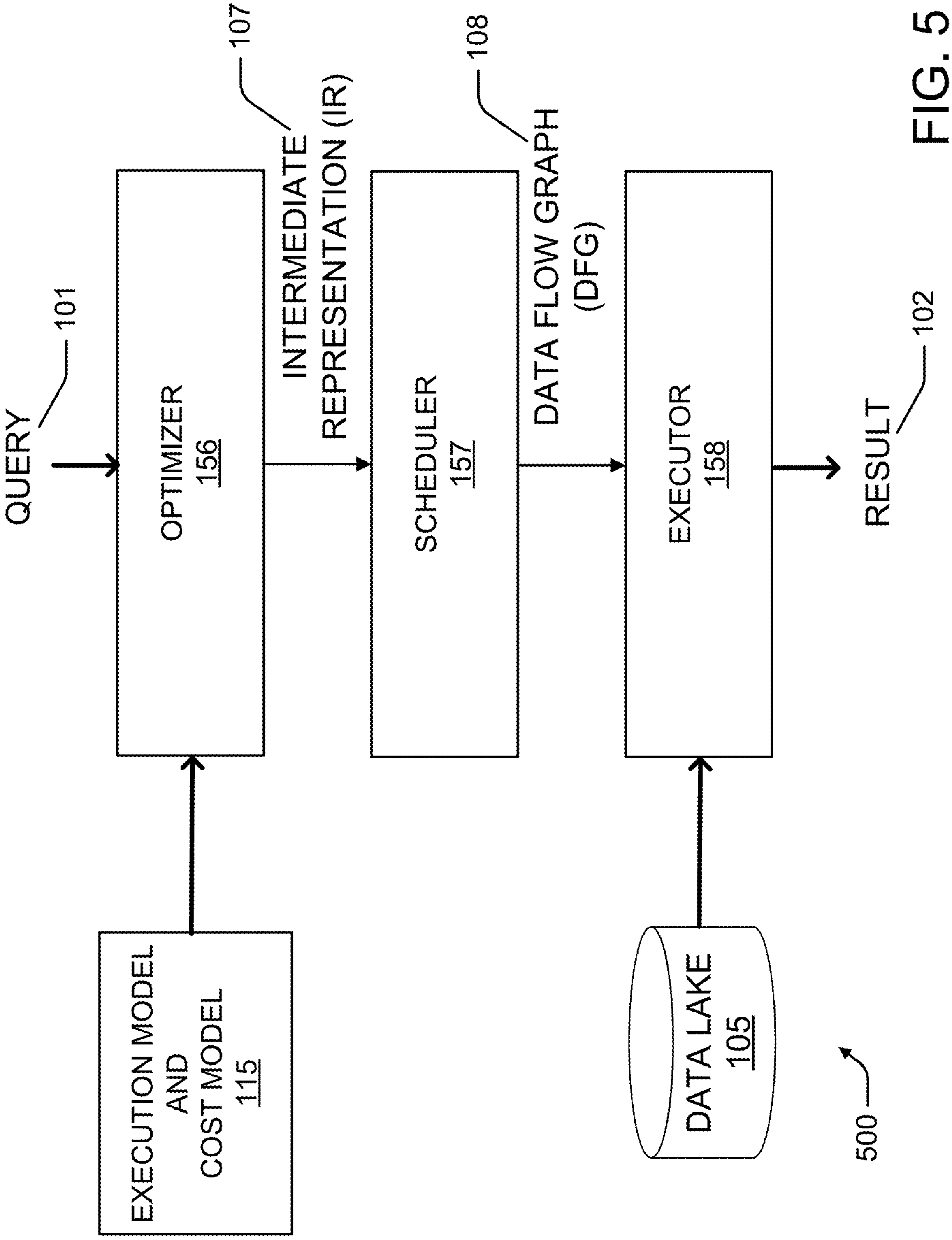
FIG. 5 is a flow diagram of a process of data analysis in one embodiment.

FIG. 5 is a flow diagram of a process 500 of data analysis that may be performed by the query server 140. The query optimizer 156 may receive a query 101 for processing, as well as execution models 115 for reference in optimizing the query. For example, an execution model may specify relevant information on the hardware and software configuration of the PDU executor 158, enabling the query optimizer 156 to adapt an IR to the capabilities and limitations of the PDU executor 158. Further, a cost model may specify limitations defined by the user regarding the resources to dedicate to processing a query over a given timeframe. The query optimizer 156 may utilize such a cost model to prioritize a query relative to other queries, define a maximum or minimum number of PDUs to be assigned for the query, and/or lengthen or shorten a timeframe in which to process the query.

The scheduler 157 may receive an optimized IR 107 from the query optimizer 156 and generate a corresponding data flow graph (DFG) 108 that defines how the query is to be performed by the PDU executor 158. For example, the DFG 108 may define the particular PDUs to be utilized in executing the query, the specific processing functions to be performed by those PDUs, a sequence of functions connecting inputs and outputs of each function, and compilation of the results to be returned to the user. Finally, the PDU executor 158 may access the data lake 105, perform the query on the accessed data as defined by the DFG 108, and return a corresponding result 102 to the user.

Figure 6:
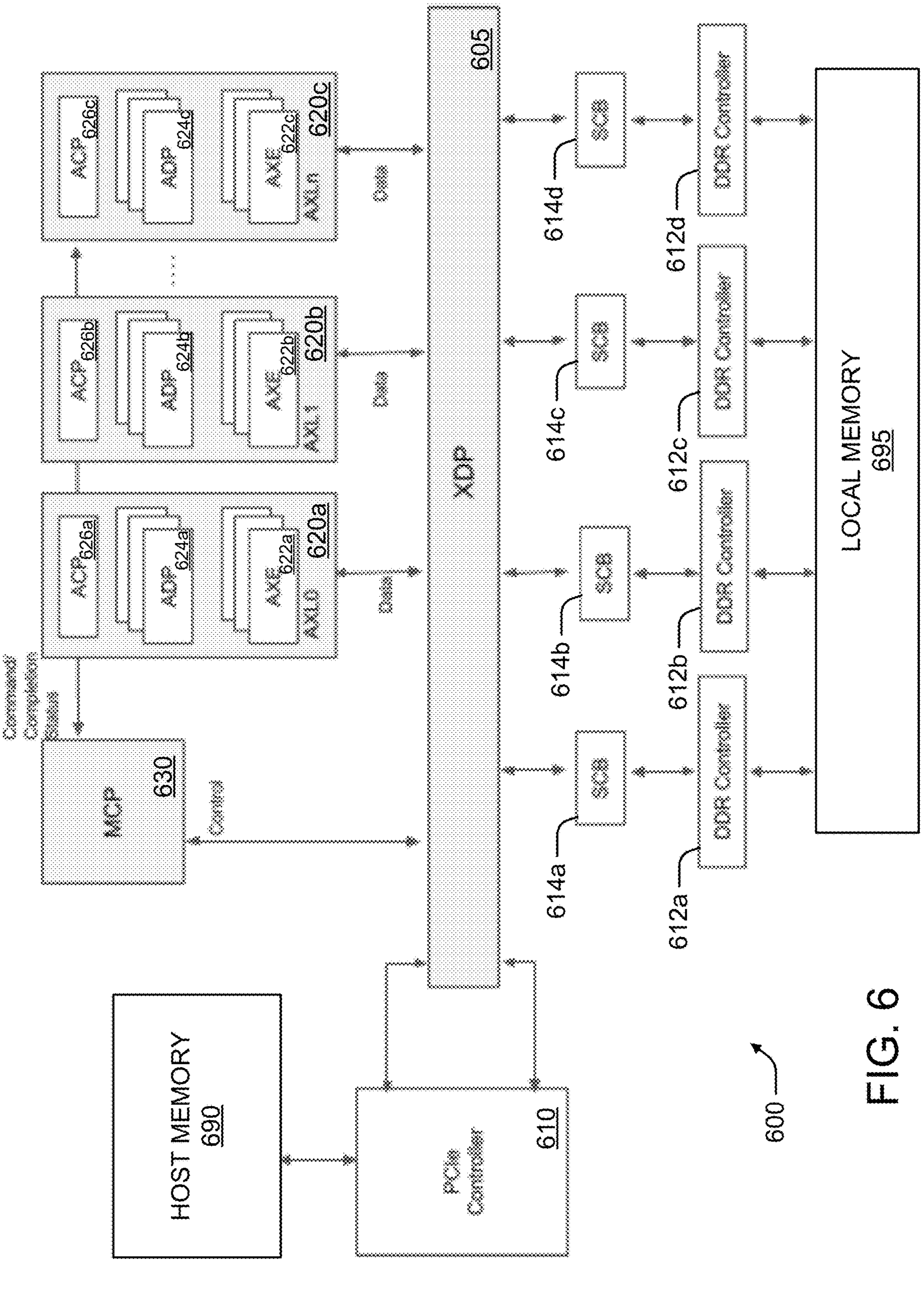
FIG. 6 is a block diagram of a programmable dataflow unit (PDU) in one embodiment.

FIG. 6 is a block diagram of a PDU 600 in one embodiment. The PDU 600 may correspond to the PDU block 116 of FIG. 1 described above, and provides hardware engines for executing the query in accordance with the workflow and include a number of distinct accelerators (AXLs) 620*a-c* that may each be optimized for different operations within the workflow. The PDU 600 possesses a processor architecture that improves computing performance by providing specialized compute elements and reducing the memory I/O access bandwidth.

The AXLs 620*a-c* may be configured with direct memory access (DMA) capability to manage data movements among the host memory (HM) 690 via a PCIe controller 610, local memory (LM) 695 via DDR controllers 612*a-d*, and on-chip memory (OCM) at the AXLs 620*a-c*. Each of the AXLs

620*a-c* may include a plurality of accelerator engines (AXEs) 622*a-c* and corresponding accelerator data panels 624*a-c*, as well as an accelerator control panel (ACP) 626*a-c*. Each of the AXEs 622*a-c* may process input data streams and generate output data streams per the instructions provided in the requests from the software. Each AXE 622*a-c* may be controlled by its corresponding ADP 624*a-b*, which may read the input data and write the output data from/to either HM 690, LM 695 or OCM at the locations specified in the requests. If multiple instances exist for a particular type of AXE 622*a-c*, they are each controlled by their respective ADP 624*a-c*. The ACP 626*a-c* manages these multiple instances by issuing tasks to each AXE 622*a-c* and tracking completions of tasks.

The main control panel (MCP) 630 may include a multiple-channel DMA controller to read the requests from the submission queues (SQs) in the host memory 690 to dispatch the requested tasks and write the responses to the completion queues (CQs) after completion of the corresponding requests. Both SQs and CQs may reside in the host memory 690 with head and tail pointers. The MCP 630 may identify the AXL type requested and dispatches the task to the corresponding AXL. The AXLs 620*a-c* may notify the MCP 630 when the task has been issued to an AXE 622*a-c*, and when the task has been completed by the AXE 622*a-c* through a completion status (CMPL) notification. The crossbar data panel (XDP) 605 may operate as an interconnect managing accesses to HM 690 and LM 695 for the MCP 630 and AXLs 620*a-c*.

Based on the query requested, a data flow graph (DFG) may be built, as described above, to process that query. The DFG may correspond to a single job or multiple jobs. Each job may include the order and instructions for AXLs 620*a-c* to be used to process the input and output databases. The AXLs 620*a-c* can be used in any order, and may need multiple passes through the same AXL (with different parameters) in order to complete the DFG. Final output of a DFG may also contain multiple new databases.

The typical size of each job can be in the order of terabytes. Accordingly, the job can be broken into smaller tasks in the order of megabytes, so as to make it manageable in the available memory capacities (HM/LM/OCM). Multiple host CPU cores can perform multiple tasks simultaneously on multiple AXLs 620*a-c*, and thus the PDU may not need to predetermine an order in which tasks can be received by a given AXL 620*a-c*. In some cases, a job may not be divisible into tasks at clean boundaries of the input data structure. In this case, when the input stream data is exhausted, an AXL 620*a-c* may save its current context in LM 695 before sending the completion status to the MCP 630. When the host sends the subsequent task(s) for the same job, it may also provide instructions to restore the context before executing the task.

The XDP 605 arbitrates the memory accesses from the MCP 630 and the AXLs 620*a-c* to the host memory 690 or local memory 695. Depending on the address, if access to the host memory 690 is detected, the XDP 605 may generate the PCIe requests to the PCIe controller 610 and forward the PCIe responses to the corresponding destination. Similarly, if local memory 695 access is detected, the XDP 605 may route the access to one of the DDR memory controllers 612*a-d* to provide access to the multiple (e.g., 4) DDR channels. In doing so, the XRP 605 may stripe access to the multiple channels at DDR boundary.

Streaming cache buffers (SCBs) 614*a-d* may provide a cache for each DDR channel to optimize the local memory access. Each DDR channel may be fronted by a respective SCB 614*a-d*, with each cache-line (DDR page size) being a given size (e.g., 2 KB). A cache line may be allocated on writes and deallocated on read. Cached data may be configured not to spill (writeback) to off-chip DDR to save DDR bandwidth. The AXL 620*a-c* writes and reads to local memory 695 may be looked up and serviced by this cache 614*a-c*. Generally, the stream data should not reside for long in the cache 614*a-c*. Instead, an AXL 620*a-c* may write the stream output, and a subsequent AXL 620*a-c* in executing the DFG may read out this stream. With some exceptions, the AXLs 620*a-c* generally read and write data sequentially. An AXL 620*a-c* that could benefit from a more traditional caching may implement such a configuration locally inside the AXL 620*a-c*.

Figure 7:
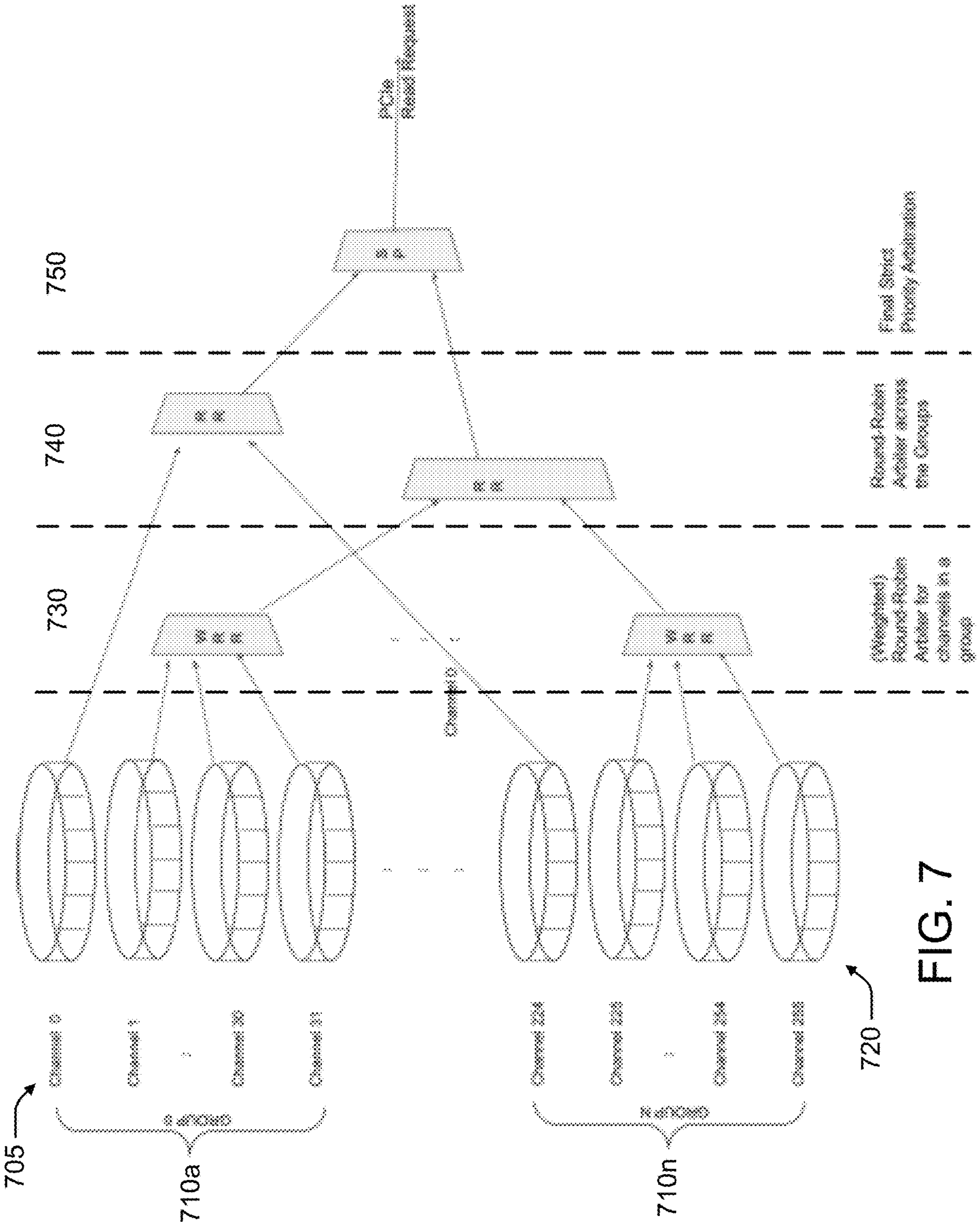
FIG. 7 is a diagram illustrating a process of scheduling of submission queue (SQ) direct memory access (DMA) channels in one embodiment.

FIG. 7 is a diagram illustrating a process of scheduling of submission queue (SQ) DMA channels 705 in one embodiment. With reference to FIG. 6, the MCP 630 may include a multiple-channel DMA controller to fetch the tasks to be performed by one or many AXLs 620*a-c* from the host memory. The MCP 630 may then dispatch these tasks to the AXLs 620*a-c*. Upon completion of the tasks, the MCP 630 may receive the completion status (CMPLs) from the AXLs 620*a-c*, and may send those updates via DMA to the host memory 690. In one example, the MCP 630 may support up to 256 DMA channels on both transmit and receive directions. Each DMA transmit and receive channel 705 may be associated with a SQ and completion queue (CQ), respectively. Both SQs and CQs may be organized in a circular queue structure 720 residing in the host memory 690. Each queue may be defined by a head-pointer (HP), a tail-pointer (TP) and a fixed data buffer size, initialized by the host software. For a SQ, the host software writes the tasks in submission queue entries (SQEs). Then, the TP may be moved to point to the last request, and may notify the MCP 630. The MCP 630 can read the request(s) starting from the SQE pointed by the HP and ending from the SQE pointed by the TP. The SQ may be empty when the HP equals the TP.

For CQs, the MCP 630 may write the responses in the completion queue entries (CQEs) after receiving the CMPLs from the AXLs 620*a-c*. Then, the MCP 630 may move the TP to point to the last response. The host software may read the response(s) starting from the CQE pointed by the HP and ending from the CQE pointed by the TP. The CQ may be empty when the HP equals the TP. The MCP 630 may also issue an interrupt when CQE goes from empty to non-empty.

The DMA channels 705 can be divided into multiple (e.g., 8, 16,32) groups 710*a-n*, each including an equal number of channels. In one example, the first channel of each group 710*a-n* may be serviced with a higher priority. When there are pending SQE(s), the MCP 630 may select the next channel to process the request(s). The SQ DMA channels within a group may be arbitrated via one or more of a round-robin (RR) stage 740, a weighted round-robin (WRR) stage 730, and a priority arbitration stage 750. The MCP 630 may read the SGL(s) for the selected channel(s) by issuing the read request(s) to the PCIe controller for the host memory 690.

To address the latency of PCIe access, the MCP 630 can pre-fetch SQEs. There may be a common shared buffer to store the multiple SQEs, which may be divided among the groups with a configured upper limit. The high priority channels may have reserved space in this storage to guarantee service. A channel may issue PCIe read requests provided that it has space to save the fetched commands (instruction sent from the MCP 630 to an AXL 620*a-c* to execute a task).

Figure 8:
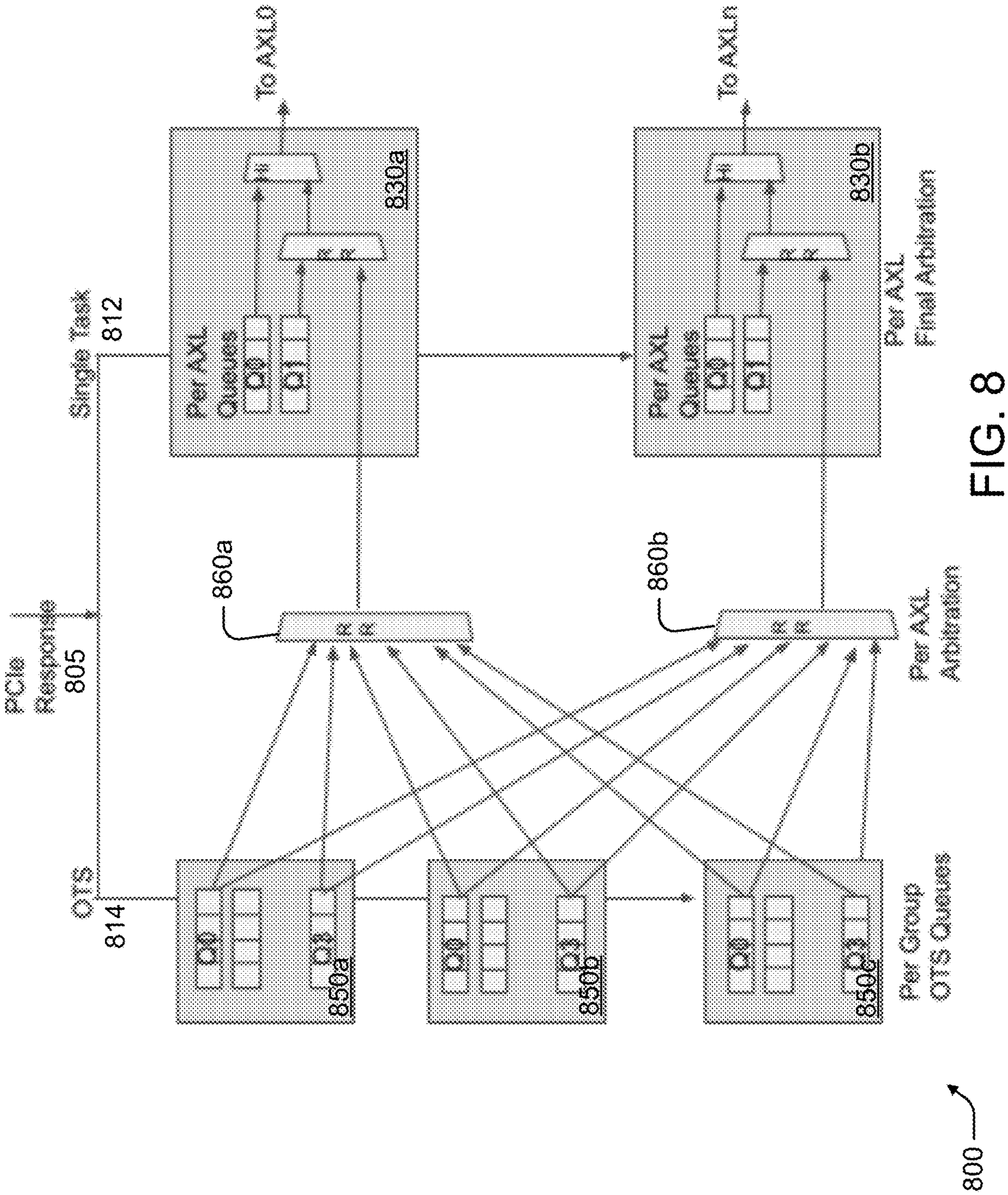
FIG. 8 is a diagram illustrating a process of dispatching accelerator tasks in one embodiment.

FIG. 8 is a diagram illustrating a process 800 of dispatching accelerator tasks in one embodiment. With reference to FIG. 6, when the MCP 630 receives a PCIe read response 805 for the SQE(s), it may parse the command to classify it as either a single task command 812 or a multiple task command, referred to as an ordered task set (OTS) 814. Single task commands 812 may be enqueued into targeted AXL queues 830*a-b*. In the example described, each AXL 620*a-b* may have two queues (Q0, Q1), wherein tasks from high priority DMA channels go to one queue (Q0), and the rest go to the other queue (Q1). In further embodiments, each AXL 620*a-c* may have additional queues to greater granularity of prioritization. Multiple task commands provide another level of hierarchy of task dispatching. Such dispatching may support multiple requests from a number of consecutive SQEs (e.g., up to 16), which is an OTS 814. Such requests can specify different AXLs for different tasks and may contain dependencies of the task(s). Once enqueued at OTS queues 850*a-c*, the requests in that queue may be executed in order.

As shown at the AXL queues 830*a-b*, single task commands and OTS dispatched tasks may be arbitrated in a round robin fashion. The winner takes lower precedence over single tasks from high priority channels. The MCP 630 may dispatch the selected task with the command to the corresponding AXL 620*a-c*. Because certain tasks may not be dispatched until some of the previous tasks have either started or completed execution, they may be separated per DMA channel queues for OTSs to avoid the potential head-of-line blocking among queues. The MCP 630 may track the status of each task in the OTS, so that it can honor the dependencies defined for each request. When the task becomes eligible for dispatch, an OTS queue 850*a-c* may be picked by a round-robin arbiter 860*a-b* for the corresponding AXL 620*a-c*.

Figure 9:
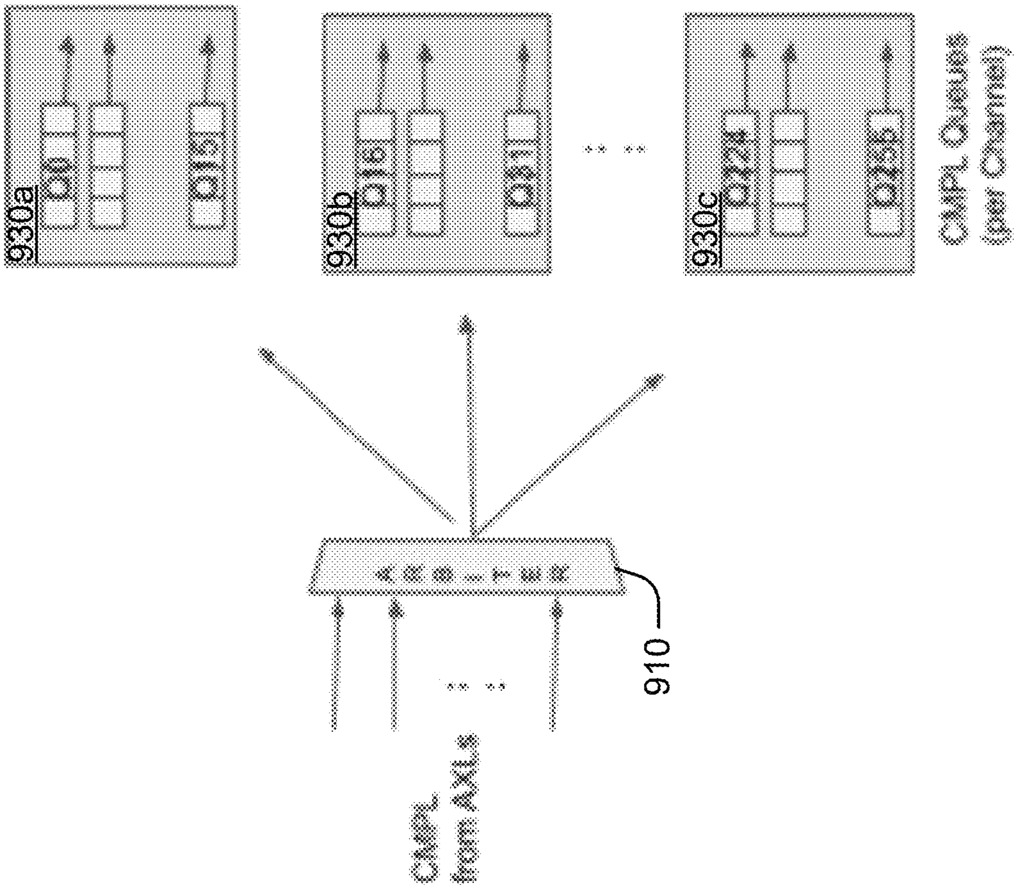
FIG. 9 is a diagram illustrating a process of returning a completion status in one embodiment.

FIG. 9 is a diagram illustrating the return of a completion status. With reference to FIG. 6, the AXLs 620*a-c* may return CMPLs to the MCP 630. The MCP 630 may implement an arbiter 910 to select the next CMPL and send it to its corresponding channel queue 930*a-c*. The arbiter 910 may be configured to honors the CMPL for high priority tasks in accordance with the prioritization described above.

Figure 10:
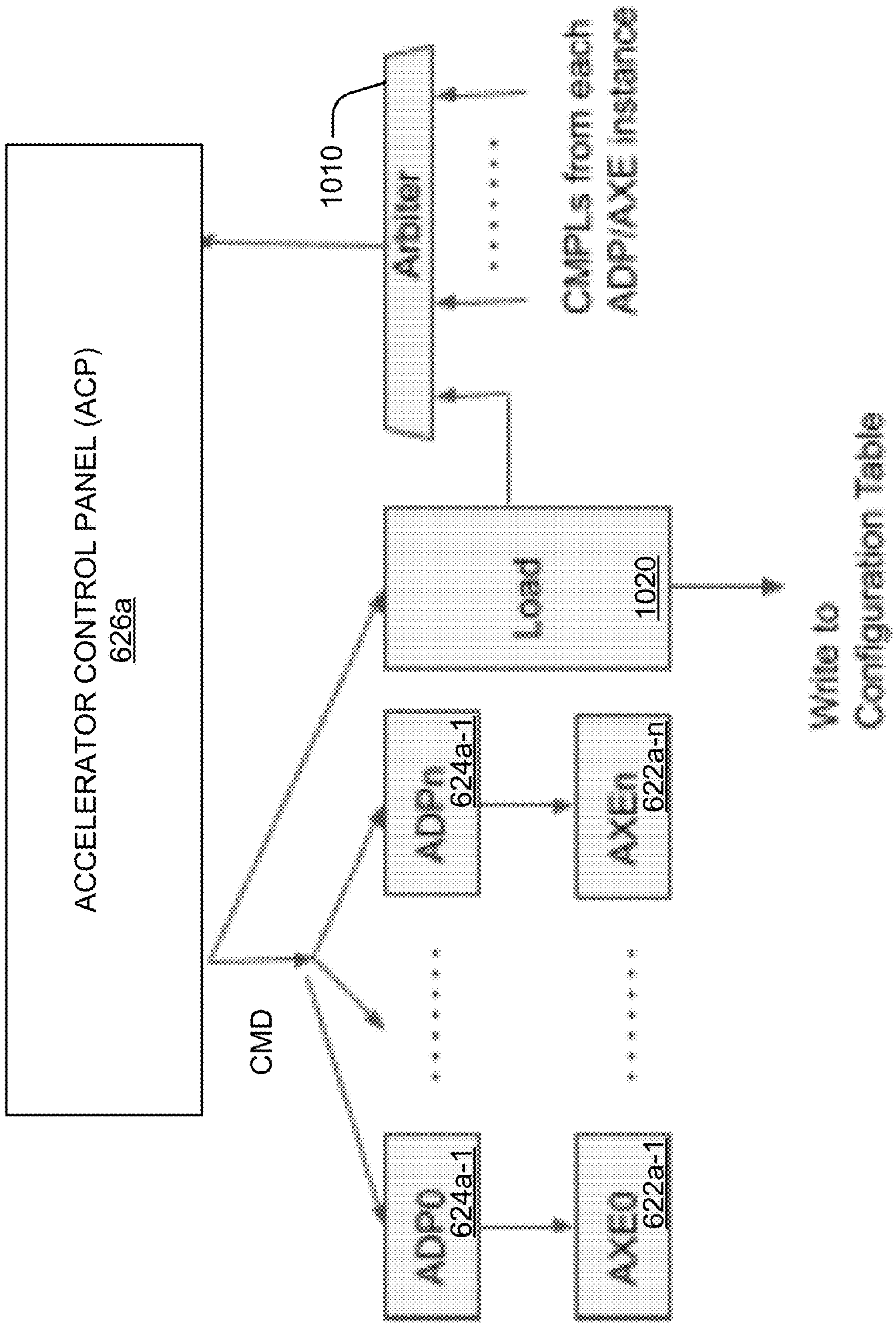
FIG. 10 is a diagram of an accelerator control panel (ACP) in one embodiment.

FIG. 10 is a diagram illustrating operation of the accelerator control panel (ACP) 626*a* in further detail. With reference to the AXL 620*a* of FIG. 6, the ACP 626*a* may operate to manage multiple instances of the AXEs 622*a*-1 . . . 622*a-n*. The ACP 626*a* may receive the command of a task which contains AXL-specific instruction from the MCP 630 and issues it to one of the free AXE instances (through the corresponding ADP). If an AXL instance contains multiple threads, the ACP 626*a* may also keep a count of available threads. After the completion of tasks, the ACP 626*a* receives the CMPLs from various AXEs (through the corresponding ADPs). The ACP 626*a* may arbitrate these CMPLs via an arbiter 1010, and may send the selected CMPL to the MCP 630. This arbiter 1010 may be configured to honor priority of CMPLs. The ACP 626*a* may also notify the MCP 630 when an AXE 622*a*-1 starts execution of the task, which assists the MCP 630 to resolve dependencies for the next task in the OTS. The ACP 626*a* may also execute the load commands via a load process 1020. Load commands may be used to write to AXLs' configuration memory (e.g. instructions for a Vector AXE, described below).

Figure 11:
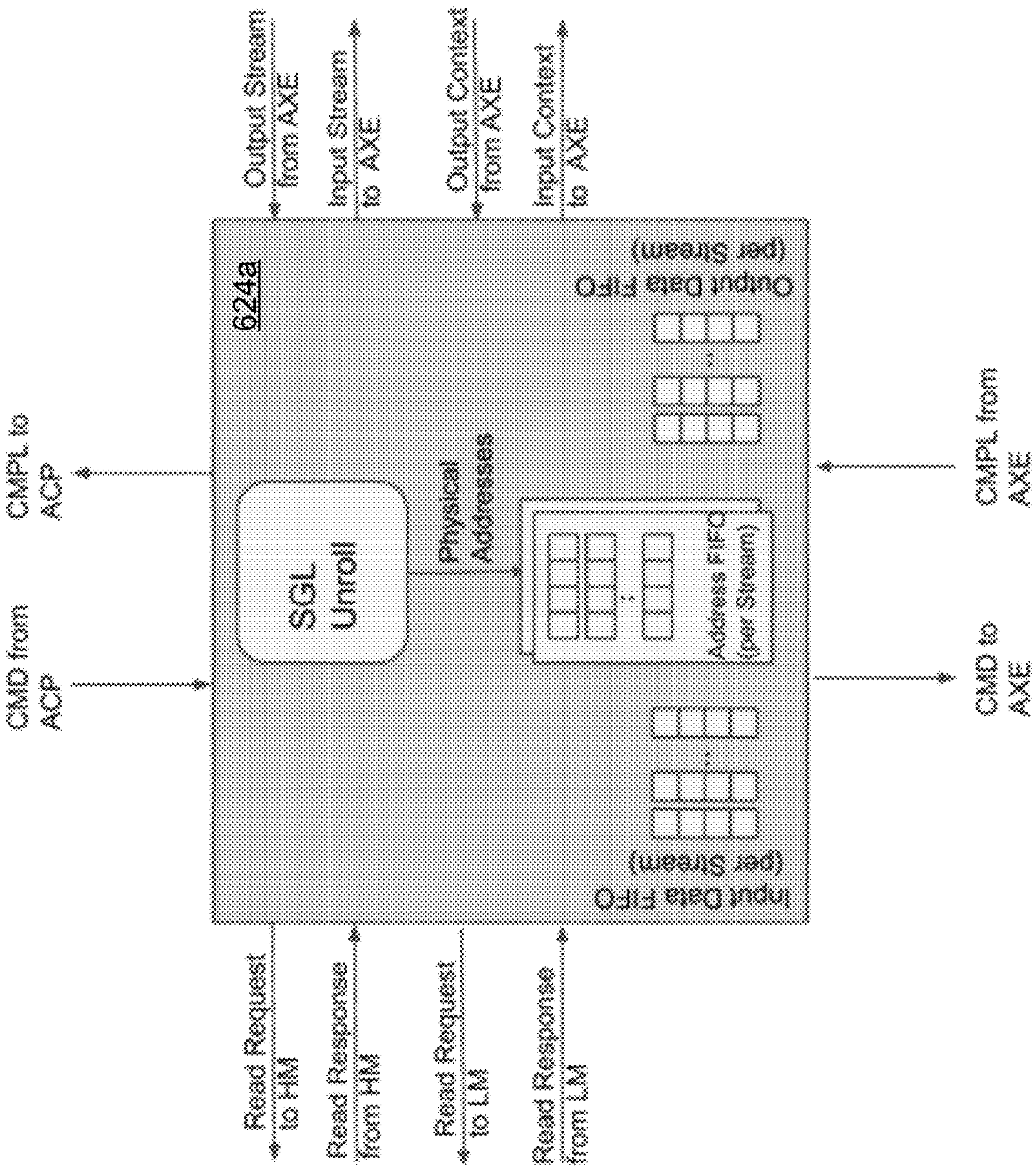
FIG. 11 is a diagram of an accelerator data panel (ADP) in one embodiment.

FIG. 11 is a diagram of an accelerator data panel (ADP) 624*a* in further detail. With reference to FIG. 6, the ADP 624*a* may directly coupled to a corresponding AXE 622*a*. It may receive the command of a task from the ACP 626*a* as described above. Each task may be specified by the SQE, which contains an accelerator opcode and operand (AXOP), task identifier (TID), input pointer (IPTR) and output pointer (OPTR). The AXOP may include AXL-specific parameters and it is sent as is to an AXE 622*a*. The IPTR and OPTR are pointers to the input and output stream data, respectively. They can point to a buffer of an array of bytes, a scatter-gather list (SGL) of data buffers, or an array of SGLs. For SGLs, the ADP 624*a* may unroll the SGLs and save the physical addresses in an address FIFO. The physical addresses may reside in local memory 695 or host memory 690. The ADP 624*a* may also prefetch the input stream data and stores it locally in the data FIFO and sends it to an AXE 622*a* as needed. Each stream may have a specific bit-width of its data unit (encoded by type) and a length which is the total number of bytes.

If an AXE 622*a* needs to randomly access the input stream data (instead of reading it serially, as typically done), it can request the ADP 624*a* to find the physical address in the Address FIFO and to generate a read request to the corresponding memory system. Because all data buffers in an SGL may be of the same size, the ADP 624*a* can quickly search for a physical address. In this case, the read response may be directly sent to the AXE 622*a*.

In addition to AXOP, some commands may need to restore context (AXE state from a previous task). The context data may be pointed to by a context pointer (CPTR) and can be saved in local memory 695. The ADP 624*a* may also read these parameters (or the AXE 622*a* may fetch it directly from local memory 695) from the CPTR and provide the values to AXE as part of the command. Similarly any AXE context after task completion can be written to CPTR, when needed. Because of the various prefetches needed before an AXE 622*a* can start execution, the ADP 624*a* may receive another command from the ACP 626*a* to start the unrolling of SGL and prefetching of physical address while the AXE 622*a* is executing the current command. Data prefetch starts only after the current command's input data is fully fetched, thus avoiding the need for a ping-pong data buffer. After the ADP 624*a* has sent the whole input data stream(s) to the AXE 622*a* and written the whole output stream(s) to host memory 690 or local memory 695 and written any context to the local memory 695, it may request an ACP 626*a* to send the CMPL to the MCP 630.

Figure 12:
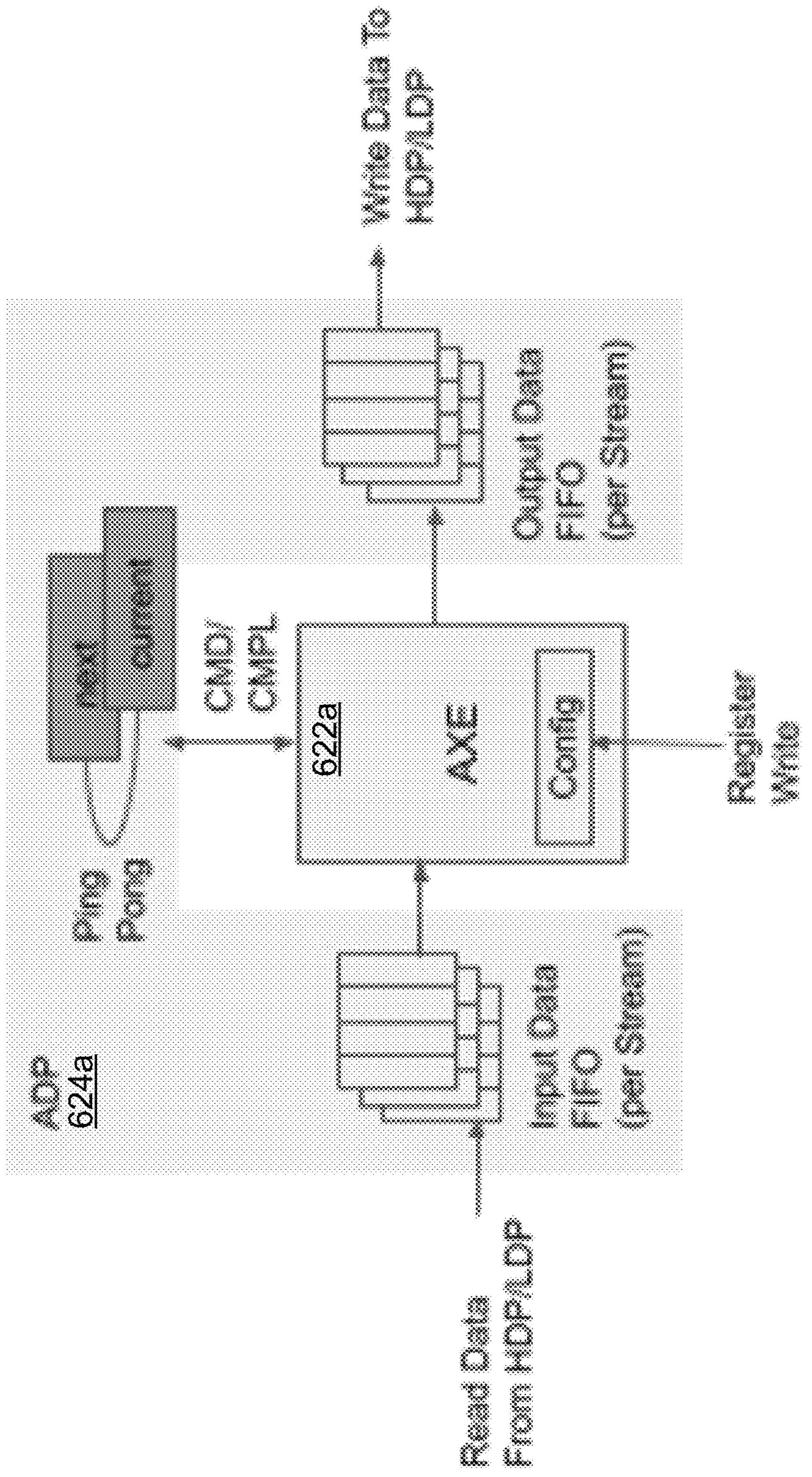
FIG. 12 is a diagram of an interface between an accelerator engine (AXE) and an ADP in one embodiment.

FIG. 12 is a diagram of an interface between an accelerator engine (AXE) 622*a* and an ADP 624*a* in one embodiment. The AXE 622*a* may work on single or multiple input streams, process the data, and write the result to single or multiple output streams. The AXE 622*a* may be controlled by its corresponding ADP 624*a*. The ADP 624*a* maintains the physical addresses that the AXE 622*a* uses to read/write the input/output stream data from either host memory 690 or local memory 695. The ADP 624*a* may also provide the AXE 622*a* any task-specific parameters received from the command.

The host may ensure that the AXE 622*a* does not receive a task until the related configuration tables have been loaded by a different command earlier. The AXE 622*a* may complete the task execution when the end of all input stream data is reached. The output stream data generated by the AXE may be of different size than input size, which may be unknown when the task was requested by software. Accordingly, the AXE 622*a* may return an output byte count (OCNT) value of each output stream in CMPL to the ADP 624*a*.

Accelerators

Turning again to FIG. 6, the accelerator units (AXLs) 620*a-c* may each be configured to process a distinct subset of the commands from the MCP 630. The subsets may each correspond to a given task of the plurality of distinct task types, such as scanning, parsing, moving, hashing, and vector processing. Accordingly, each of the AXLs 620*a-c* may be configured as a specialized processor for a given task type, and may be referred to by the name of the given task type. Example AXLs configured for various tasks are described in further detail below.

Scanning Accelerator

One or more of the AXLs 620*a-c* may be configured as a scanning accelerator, which may perform tasks including:

a) Tokenize Mode: Split the input stream into multiple tokens based on a table defining a plurality of data classes each associated with a respective token b) Like Mode: Divide the input stream into a plurality of strings and identifying a pattern common to the plurality of strings, and c) Filter Mode: Identify multiple overlapping patterns occurring within the input stream.

The scanner accelerator may include two parts: a scanner logic implemented as a Deterministic Finite Automata (DFA), and DFA states table stored in on-chip and/or external memory. A software compiler may takes input patterns as regular expressions and output the tables used by the scanner accelerators.

In tokenize mode, for each detected token, scanner accelerator may output a token description containing a token ID and sequence of characters that form the token. In one example, token ID0 is reserved for internal use by the scanner hardware implementation, token ID1 by convention indicates to the parser that the scanner has detected an error, and token ID2 is used internally by the scanner to indicate character strings, such as white space, that are to be matched but not sent to the parser. If the upper bit of the token ID is set, it is stripped off and an empty string is sent to the parser as the text of the token; this feature is used for keywords whose text is unnecessary. In tokenize mode, the produced tokens may go to external memory or to an attached parser accelerator depending on the parameters provided in request.

In like mode, the scanner input is a byte stream consisting of fixed-length strings. The scanner accelerator runs the DFA for each string and for each string it outputs a bit indicating whether the DFA accepted the entire string. A bit value of one indicates that DFA accepted the string and bit value of zero indicates it did not. In filter mode, it outputs a token index, and an ending offset of the token within the input stream. In this mode, scanner finds all matches in the input stream, including overlapping matches.

In one example, the compiler input for the scanning accelerator can include comment lines, blank lines, and pattern lines. Each pattern line is of the form:

pattern [token #[state state #[next nextstate #]]]

wherein:

a) pattern is the pattern to be scanned for, described below b) token # is the token number to be output if the pattern matches c) state # is the scanner state in which this pattern is active d) nextstate # is the scanner state to be made active if the pattern matches e) The nextstate #defaults to the state # and the state #defaults to zero States can be used, particularly in tokenizers, if the set of allowable tokens changes based on the appearance of other tokens. For example, in XML format, the set of allowable tokens is different inside angle brackets from those outside. In Like mode, there may be only one pattern in the file, and it is the only thing in the line.

The scanner compiler optionally takes as input a token definition file produced by the parser compiler. Using the data in this file ensures that the scanner and parser will agree on the tokens' numeric values. The file may include one definition per line; each line contains the token's name, whitespace, and its decimal value.

The scanning accelerator may store information about DFAs in a graph table, which is a 64-bit wide memory shared by multiple scanner instances. The graph table consists of a single global character-class table, local character-class tables, and node tables. The global character-class table is in the first 68 entries of the graph table. The DFAs (multiple can be loaded simultaneously) take up the rest of the graph table, with each DFA stored contiguously. Each DFA contains its local character-class table first followed by its node table.

The DFA graph may be stored as an array of nodes, each of which consists of a set of 64-bit arcs. During execution of the algorithm, there is a current node and a current arc within it. At each step, the current input byte is hashed with the current arc's hash mask to produce an index which is less than 256. The current arc's next_node field points to the next node to read; the hashed index indicates the arc to read within that node. Some of the nodes in the table, appearing at the beginning of the table, are referred to as reference nodes. The only difference between them and "normal" nodes is that they all have 256 arcs. When the DFA finds a mismatch at its current arc, it goes to the reference node indicated by the current arc's default_arc field. Because no hashing is done, i.e., hash_mask is assumed to be Oxff, the input byte is used as the index into the node.

The character-class table is a 32-entry×256-bit sized logical table split into two physical tables. A global table of size 17-entry×256-bit contains the character classes values with indices [0, 16]. This table is shared by all scanner instances and is configured by software during initialization time. Each DFA loaded into the node table contains local character classes, as many as needed, at the beginning of the graph, i.e., at graph_base. The index value range of these character classes is [17,31]. The 256-bits in each entry of the table are stored in little-endian format, i.e., bit0 is in right most position and bit255 is in left most position.

Parsing Accelerator

One or more of the AXLs 620*a-c* may be configured as a parsing accelerator unit configured to 1) parse a stream of tokens based on a ruleset, the stream of tokens indicating data classes of the input stream, 2) generate multiple output streams each corresponding to a distinct data field type. In the example described below, a parsing accelerator may take a stream of tokens output by a tokenizer and parse it according to given LALR (1) grammar. It also applies some operations on the parsed tokens and produces output stream (s). The grammar is pre-compiled in software and provided to the hardware as four lookup tables action, goto, field_info and field_ops.

An example parsing accelerator may provide the following features:

a) Extracts fields from structured and semi-structured data.

b) Converts or casts the extracted fields into desired data types.

c) Validates the document according to given schema.

d) Parses nested structures and extract fields from them.

e) Avoids storing null fields.

f) Recovers from syntax errors like missing or unexpected fields.

Figure 13:
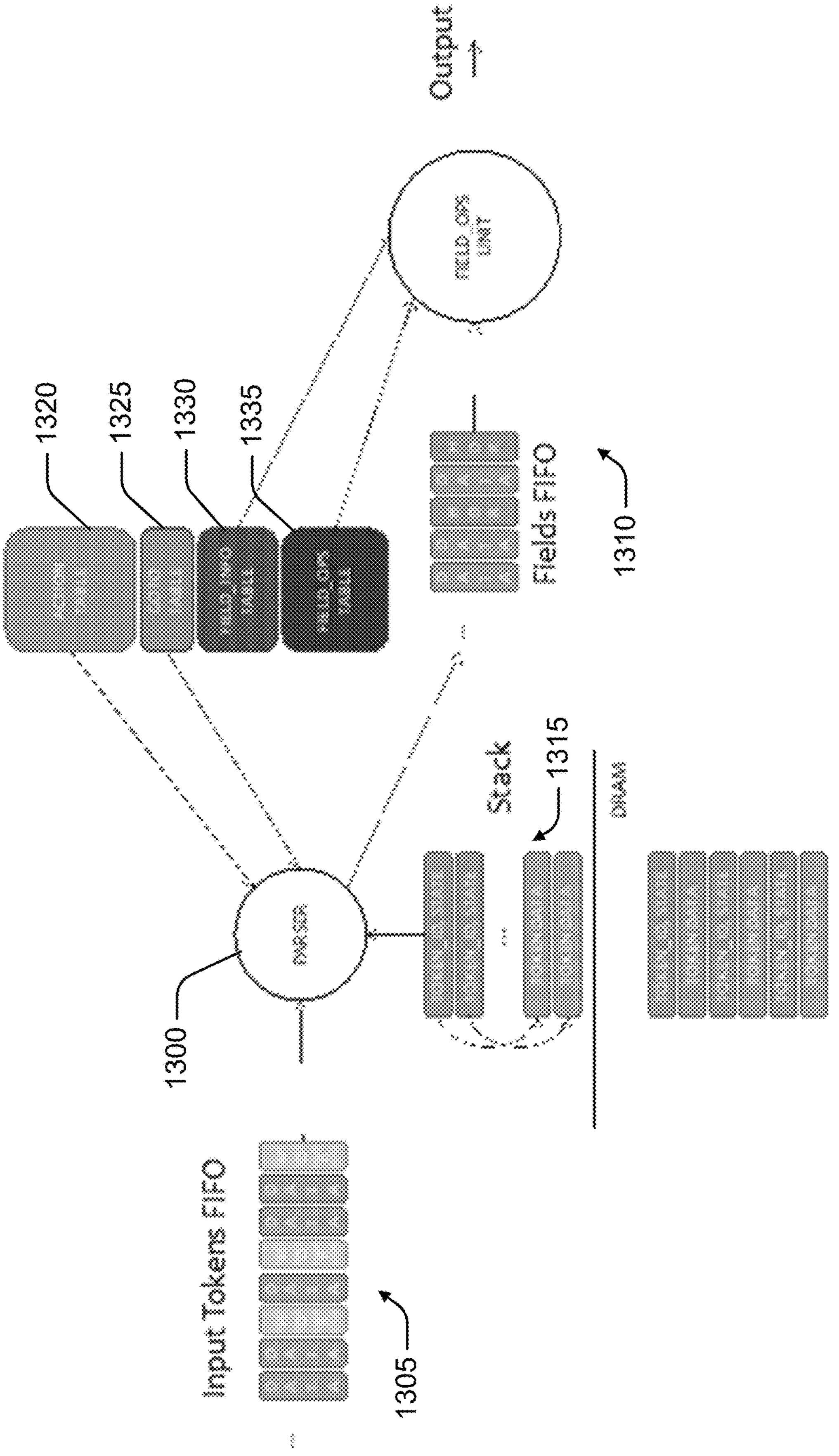
FIG. 13 is a diagram illustrating operation of a parsing accelerator in one example.

FIG. 13 is a diagram illustrating operation of a parsing accelerator 1300 in one example. The input 1305 is a stream of tokens from a tokenizer, such as CSV tokens, JSON tokens, and XML tokens. The parsing accelerator extracts fields from input tokens and produces one or more output streams 1310 for each extracted field. The streams may include the extracted data field, its definition and repetition levels and validity of the whole record.

A parser stack 1315 holds the token id, token length, token data pointer and current state of the parser. In one example, token_id contains the token identifier that was pushed as part of the last shift action and token_length contains the length of the token. state contains the current state of the parser. Stack consists of an on-chip portion and spills over to the end of the memory pointed by the context_ptr. As part of a context save operation, on-chip portion is pushed to the context_ptr and as part of resume operation, on-chip portion is re-populated from the context_ptr.

An action table 1320 and a Goto table 1325 are implemented as hash tables and stored contiguously one after other, i.e., action table followed by goto table. Each entry in the hash table consists of a 32-bit index followed by 32-bit value. First two entries in the table consist of a header and they contain the sizes of the action/goto tables and number of bits to pick from the token id or non-terminal during hashing.

A field_info table 1330 and field_ops table 1335 are 32-bit wide flat tables stored contiguously one after other, (e.g., field_info table followed by field_ops table). A first entry in the tables contains a header with the sizes of the field_info and field_ops tables. The field_info table 1330 contains the information of the fields being extracted as part of the parsing. This information includes the data type of the field, its output stream numbers etc. The field_info table 1330 is indexed by the field number. The field_ops table 1335 contains the field operations to run as part of a reduce operation. It is indexed by rule_id found in the action table.

Mover Accelerator

One or more of the AXLs 620*a-c* may be configured as a mover accelerator unit configured to 1) generate a transformed output stream based on the input stream, and 2) direct the transformed output stream to a location distinct from that of the input stream. Thus, the mover accelerator moves data from one memory location to another while performing one or more transformations on the data, including projection, building tuples, and de-tuple fields. An example mover accelerator may provide the following features:

a) Accelerates the relational algebra operations like projection.
b) Converts row-major format to column major format and vice versa.
c) Consume and produce structured data with nesting.

In one example, the transformations performed by the mover accelerator include:

a) Identity: Copy input to output
b) Constant: Fill output with given input value
c) Ascend: Fill output with ascending sequence (input, step)
d) Descend: Fill output with descending sequence (input, step)
e) Project: Copy only selected items from each stream
f) Tuple: Merge multiple streams into a single stream
g) Detuple: Separate fields of a stream into individual streams An identity transform does not change the input data. Rather, it moves the data from input location to the output location. It is used to move data from host DRAM to host DRAM, host DRAM to accelerator's local DRAM and vice versa. A constant transform fills the output with given input value. In this request, input_ptr contains the value to use as constant. An ascend transform is similar to the constant transform except that the value is incremented on each use by a given step value and the value is wrapped around on overflow. A descend transform is similar to a constant transform except that the value is decremented on each use by a given step value and the value is wrapped around on overflow.

A project transform takes a set of input streams, one of which is a bit stream. It parses the bit stream and returns the respective elements from other streams where the bit stream has a value that is not equal to the invert field in the request. A tuple transform takes a set of input streams and merges each element from the stream producing a single output single stream. Lastly, a detuple transform takes a single input stream and splits the individual elements into separate output streams, and is an inverse operation of a tuple transform.

Hasher Accelerator

One or more of the AXLs 620*a-c* may be configured as a hasher accelerator unit configured to 1) update a hash table comprising a plurality of entries, each entry including a key and a set of values, 2) perform a search of the input stream to identify values base on the hash table, and 3) generate the output stream as a result of the search.

Figure 14:
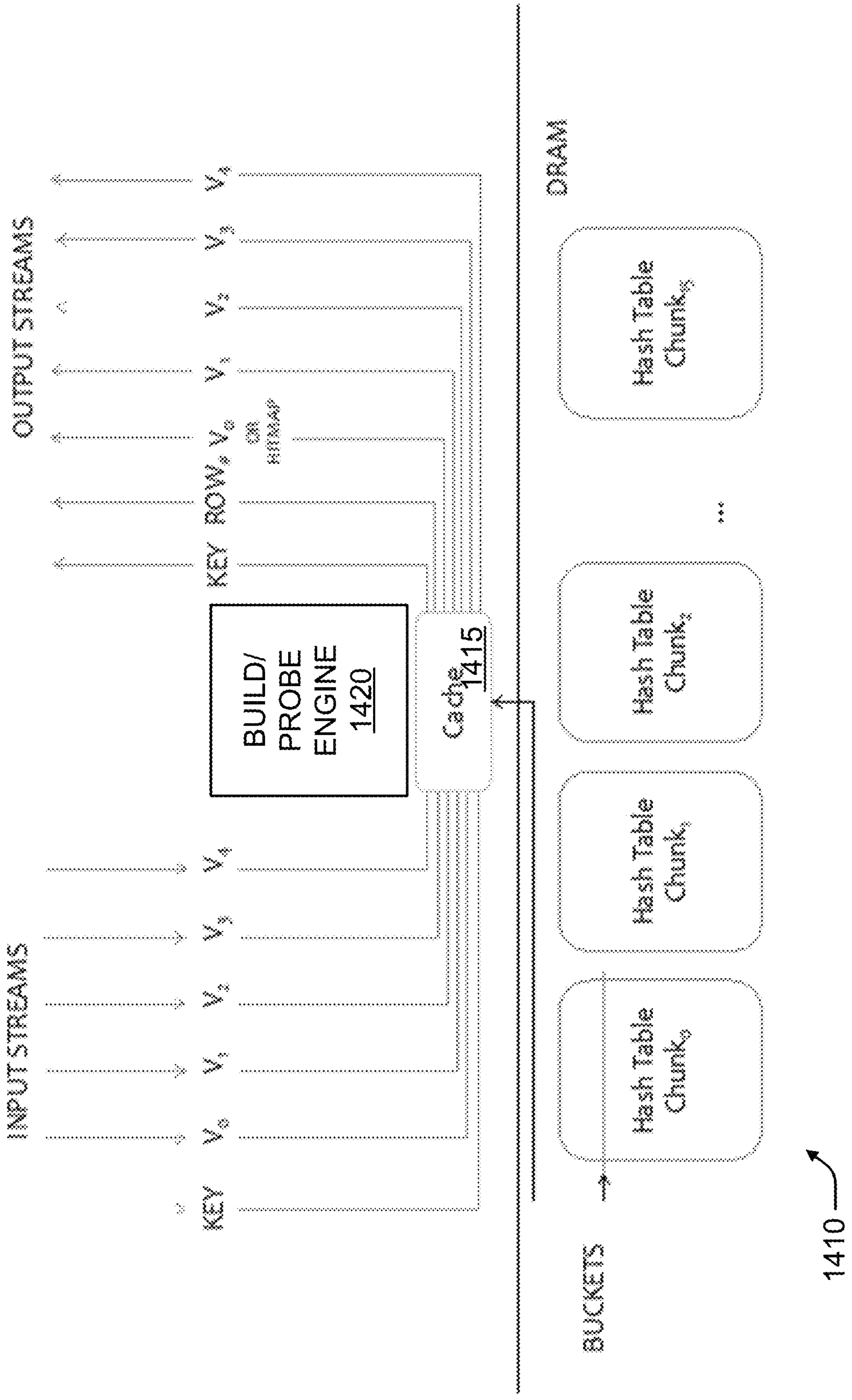
FIG. 14 is a diagram illustrating an execution environment of a hasher accelerator in one example.

FIG. 14 is a diagram illustrating an execution environment of a hasher accelerator, which includes a set of hash tables 1410 stored in local memory, an on-chip cache 1415, and a build/probe engine 1420. The hash tables 1410 include configurable fixed size entries, and each entry may include a key and a set of values. The values may represent the field value itself or an aggregation of a field value. In one example, a hasher accelerator may operate to perform "equi-join" and "group by" operations of a data analytics pipeline. The hasher accelerator runs in two primary modes: build and probe. In build mode, it builds and updates the hash table while performing some configured aggregations. In this mode, each aggregation function specifies 1) whenever there is a hit, 2) what operation to perform with the existing value in the hash table row, and 3) the incoming stream number to use. In probe mode, used for join operations, the hasher looks up the hash table built in build phase and outputs the search results.

Vector Processor Accelerator

One or more of the AXLs 620*a-c* may be configured as a vector processor accelerator unit configured to 1) perform an arithmetic operation on a plurality of input streams including the input stream, and 2) generate the output stream as a result of the arithmetic operation. In one example, a vector processor accelerator takes multiple streams of various data types and evaluates an expression using them. The expressions may include map functions like add, subtract etc. or reduce functions like sum, min, max etc. The map or reduce functions can be arithmetic, relational, logical, bitwise, chrono, etc.

Figure 15:
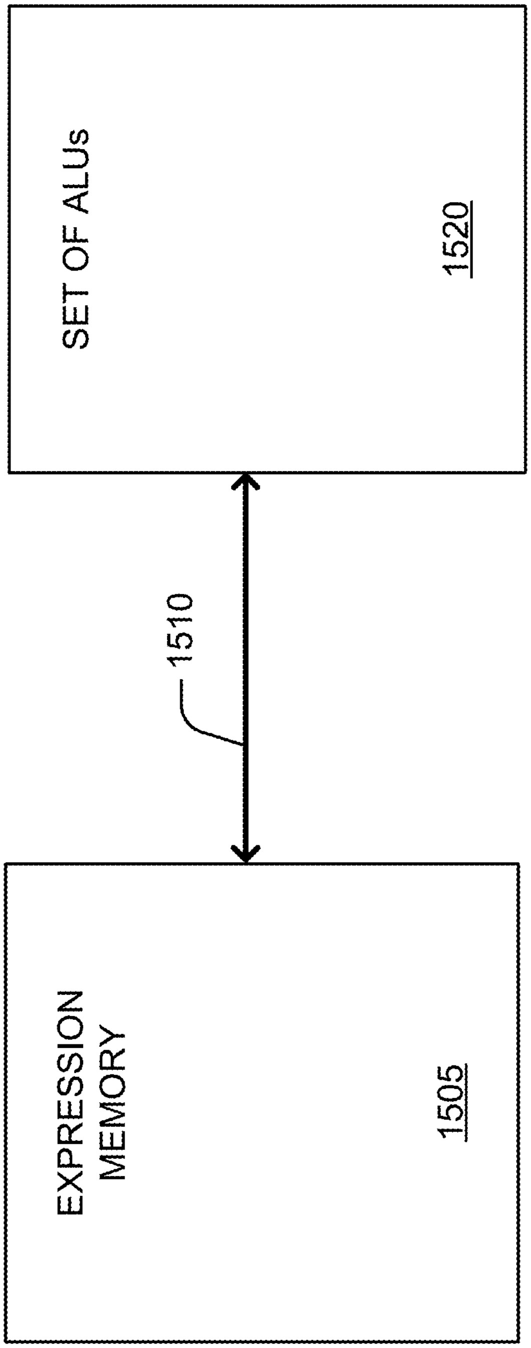
FIG. 15 is a diagram illustrating an execution environment of a vector processor accelerator in one example.

FIG. 15 is a diagram illustrating an execution environment of a vector processor accelerator, which includes an expression memory 1505, a set of Arithmetic-Logic Units (ALUs) 1520, and an interconnect 1510 between them. Each ALU of the set 1520 has two inputs and can take input from the host or from another ALU. The expression memory 1505 holds the configuration of ALUs and their interconnect for the expressions to be evaluated. The memory 1505 may hold the configuration of multiple expressions, and a host request contains an index into this table from which the configuration is loaded into the ALU array for that request. The ALU configuration includes the operation to perform left-hand side select, right-hand side select, and output data types. The set of ALUs 1520 can perform arithmetic, relational, bitwise, chrono and string operations on various data types.

While example embodiments have been particularly shown and described, it will be understood by those skilled in the art that various changes in form and details may be made therein without departing from the scope of the embodiments encompassed by the appended claims.

What is claimed is:

1. A circuit for processing a data analytics query, comprising:

a manager (MCP) configured to:

parse a data flow graph (DFG) corresponding to the data analytics query, the DFG defining a sequence of tasks having a plurality of distinct task types, and issue a plurality of commands each corresponding to a respective one of the sequence of tasks; and a plurality of accelerator units (AXL) each configured to process a subset of the commands corresponding to a given task of the plurality of distinct task types, each accelerator unit including:

a plurality of executors (AXE) configured to perform the given task on an input data stream and generate an output data stream, a controller (ACP) configured to assign the subset of the commands to the plurality of executors, and a plurality of data interfaces (ADP) each associated with a respective one of the plurality of executors and configured to generate the input data stream and write the output data stream to a memory.

2. The circuit of claim 1, wherein the manager is further configured to:

map the sequence of tasks to the plurality of accelerator units in accordance with the data flow graph; and configure a plurality of logical connections between the plurality of accelerator units, the plurality of logical connections corresponding to links between the sequence of tasks of the data flow graph.

3. The circuit of claim 1, further comprising a streaming cache buffer connected between the memory and the plurality of accelerator units, the streaming cache buffer configured to 1) allocate a cache line for a write by one of the plurality of data interfaces, 2) maintain a read count of the cache line, and 3) deallocate the cache line in response to the read count decrementing to a threshold value.

4. The circuit of claim 3, wherein the streaming cache buffer is configured to store structured data via a value stream and an auxiliary stream.

5. The circuit of claim 1, wherein the manager includes a plurality of submission queues, the manager configured to:

read the sequence of tasks as respective entries from the plurality of submission queues; and issue the plurality of commands in an order corresponding to an output of the plurality of submission queues.

6. The circuit of claim 5, wherein the manager includes an arbiter configured to determine the output of the plurality of submission queues based on a weighted round-robin priority.

7. The circuit of claim 1, wherein each of the manager and the plurality of accelerator units is configured to control a respective data path to the memory.

8. The circuit of claim 7, further comprising a crossbar unit (XDP) configured to arbitrate memory access requests by the plurality of accelerator units.

9. The circuit of claim 1, wherein the plurality of distinct task types include at least one of scanning, parsing, moving, hashing, and vector processing.

10. The circuit of claim 1, wherein the plurality of accelerator units include a scanning accelerator unit configured to perform at least one of:

splitting the input stream into multiple tokens based on a table defining a plurality of data classes each associated with a respective token;

dividing the input stream into a plurality of strings and identifying a pattern common to the plurality of strings; and identifying multiple overlapping patterns occurring within the input stream.

11. The circuit of claim 1, wherein the plurality of accelerator units include a parsing accelerator unit configured to:

parse a stream of tokens based on a ruleset, the stream of tokens indicating data classes of the input stream; and generating multiple output streams each corresponding to a distinct data field type.

12. The circuit of claim 1, wherein the plurality of accelerator units include a mover accelerator unit configured to:

generate a transformed output stream based on the input stream; and direct the transformed output stream to a location distinct from that of the input stream.

13. The circuit of claim 1, wherein the plurality of accelerator units include a hasher accelerator unit configured to:

update a hash table comprising a plurality of entries, each entry including a key and a set of values;

perform a search of the input stream to identify values base on the hash table; and generate the output stream as a result of the search.

14. The circuit of claim 1, wherein the plurality of accelerator units include a vector processor accelerator unit configured to:

perform an arithmetic operation on a plurality of input streams including the input stream; and generate the output stream as a result of the arithmetic operation.

15. The circuit of claim 1, wherein the controller is further configured to control the output data stream to generate a continuous output.

16. The circuit of claim 1, wherein the plurality of data interfaces are further configured to write the output data stream concurrently with the performance of the given task by the plurality of executors.

* * * * *